(12) United States Patent
Bowers et al.

(10) Patent No.: US 8,454,369 B2
(45) Date of Patent: Jun. 4, 2013

(54) EXTENSIBLE EXAM LANGUAGE (XXL) PROTOCOL FOR COMPUTER BASED TESTING

(75) Inventors: Clarke D. Bowers, Baltimore, MD (US); Tronster Maxwell Hartley, Cockeysville, MD (US); Kyle Michael Kvech, Baltimore, MD (US); William Howard Garrison, Cockeysville, MD (US)

(73) Assignee: Prometric, Inc., Baltimore, MD (US)

( * ) Notice: Subject to any disclaimer, the term of this patent is extended or adjusted under 35 U.S.C. 154(b) by 1112 days.

(21) Appl. No.: 12/392,776

(22) Filed: Feb. 25, 2009

(65) Prior Publication Data

US 2009/0162829 A1    Jun. 25, 2009

Related U.S. Application Data

(62) Division of application No. 12/390,930, filed on Feb. 23, 2009, which is a division of application No. 10/292,911, filed on Nov. 13, 2002, now Pat. No. 7,494,340, said application No. 12/392,776 is a division of application No. 12/391,436, filed on Feb. 24, 2009, which is a division of application No. 10/292,911.

(60) Provisional application No. 60/331,228, filed on Nov. 13, 2001.

(51) Int. Cl.
G09B 11/00 (2006.01)
G09B 5/00 (2006.01)

(52) U.S. Cl.
CPC .................................. *G09B 5/00* (2013.01)
USPC ........................ 434/323; 434/350; 707/687

(58) Field of Classification Search
USPC ........ 434/322, 323, 307 R, 350, 365; 707/687
See application file for complete search history.

(56) References Cited

U.S. PATENT DOCUMENTS

| 5,157,782 | A |   | 10/1992 | Tuttle et al. |
| 5,195,033 | A |   | 3/1993  | Samph et al. |
| 5,318,450 | A |   | 6/1994  | Carver |
| 5,359,546 | A | * | 10/1994 | Hayes et al. ............ 714/28 |
| 5,506,832 | A |   | 4/1996  | Arshi et al. |
| 5,513,994 | A |   | 5/1996  | Kershaw et al. |
| 5,565,316 | A |   | 10/1996 | Kershaw et al. |

(Continued)

OTHER PUBLICATIONS

Jan. 27, 2003, International Search Report, from PCT/US02/36264.

(Continued)

*Primary Examiner* — Kathleen Mooser
(74) *Attorney, Agent, or Firm* — Wilmer Cutler Pickering Hale and Dorr LLP

(57) ABSTRACT

A memory stores a plurality of first data structures, which includes element specific data objects indicating a classification of at least one of the plurality of segments of the test definition language, and second data structures, which include attribute specific data objects indicating at least one attribute of the segments of the test definition language implemented by a computer. A method for computer-based testing includes authoring a test specification and content of the at least one test using a test definition language, compiling the test specification and content of the at least one test to create a compiled test specification and content, which includes validating the test specification and content, storing the compiled test specification and content to a resource file, and retrieving the compiled test specification and content from the resource file during delivery of the test.

28 Claims, 39 Drawing Sheets

U.S. PATENT DOCUMENTS

| | | | |
|---|---|---|---|
| 5,629,878 A | | 5/1997 | Kobrosly |
| 5,659,547 A | | 8/1997 | Scarr et al. |
| 5,743,743 A | | 4/1998 | Ho et al. |
| 5,827,070 A | | 10/1998 | Kershaw et al. |
| 5,854,930 A | | 12/1998 | McLain, Jr. et al. |
| 5,946,474 A | | 8/1999 | Skogby |
| 6,000,945 A | * | 12/1999 | Sanchez-Lazer et al. .... 434/322 |
| 6,018,617 A | | 1/2000 | Sweitzer et al. |
| 6,029,257 A | | 2/2000 | Palmer |
| 6,112,049 A | * | 8/2000 | Sonnenfeld .................... 434/350 |
| 6,134,674 A | | 10/2000 | Akasheh |
| 6,138,252 A | | 10/2000 | Whitten et al. |
| 6,149,438 A | | 11/2000 | Richard et al. |
| 6,149,441 A | | 11/2000 | Pellegrino et al. |
| 6,243,835 B1 | | 6/2001 | Enokido et al. |
| 6,289,472 B1 | | 9/2001 | Antheunisse et al. |
| 6,418,298 B1 | | 7/2002 | Sonnenfeld |
| 6,431,875 B1 | * | 8/2002 | Elliott et al. .................. 434/322 |
| 6,505,342 B1 | | 1/2003 | Hartmann et al. |
| 6,681,098 B2 | | 1/2004 | Pfenninger et al. |
| 6,704,741 B1 | | 3/2004 | Lively, Jr. et al. |
| 6,725,399 B1 | | 4/2004 | Bowman |
| 6,859,922 B1 | | 2/2005 | Baker et al. |
| 6,898,712 B2 | | 5/2005 | Vignoles et al. |

OTHER PUBLICATIONS

Mar. 13, 2003, International Search Report, from PCT/US02/36288.
Mar. 14, 2003, International Search Report, from PCT/US02/36286.
May 12, 2003, International Search Report, from PCT/US02/36287.
Oct. 14, 2004. International Search Report for PCT Application No. PCT/US02/36220.

* cited by examiner

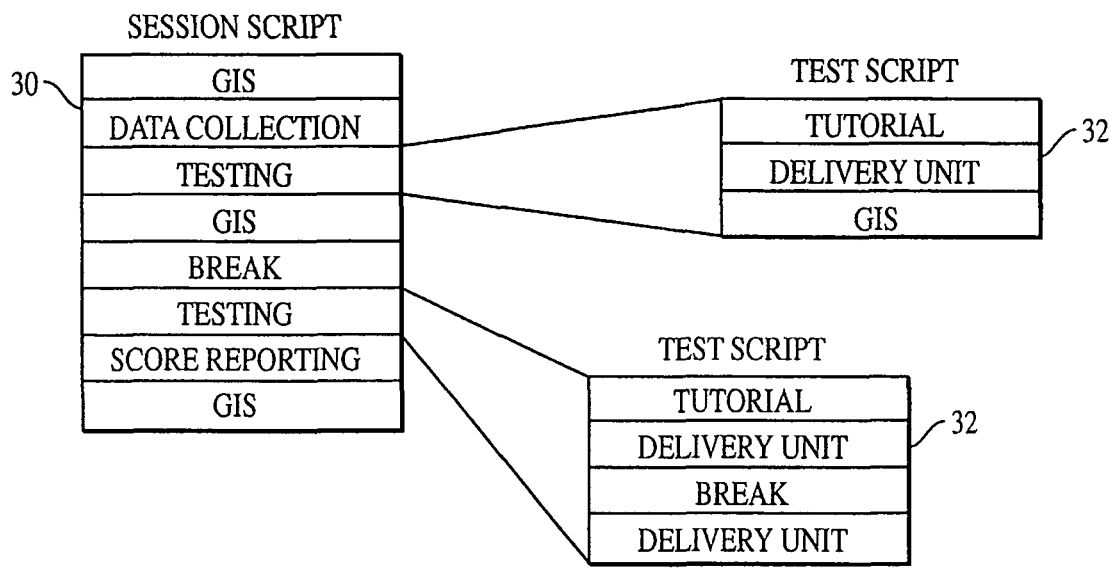
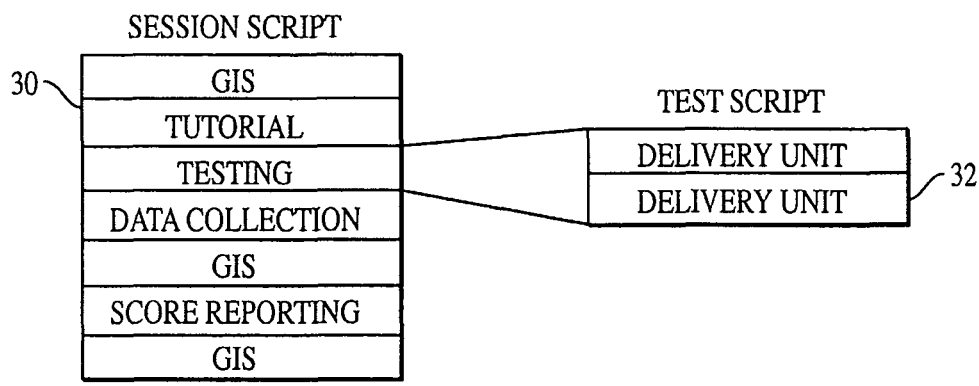
FIG. 2
PRIOR ART

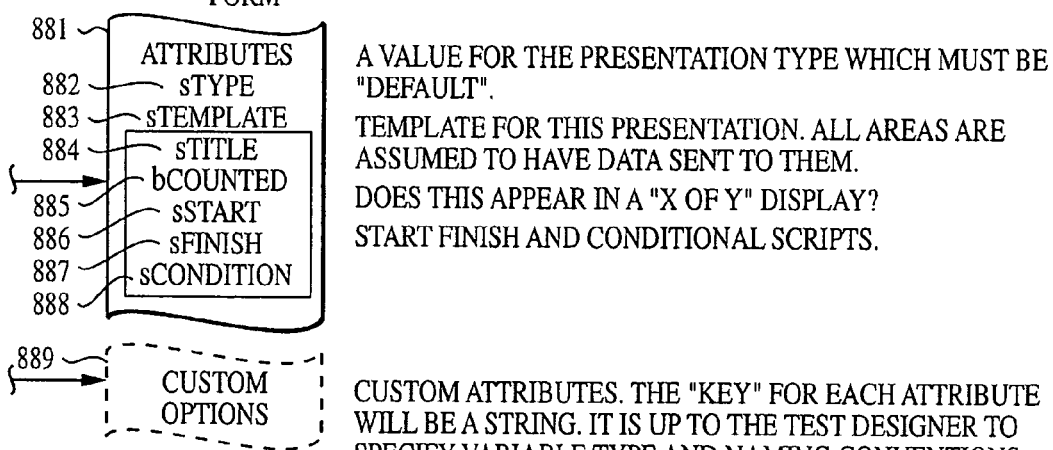
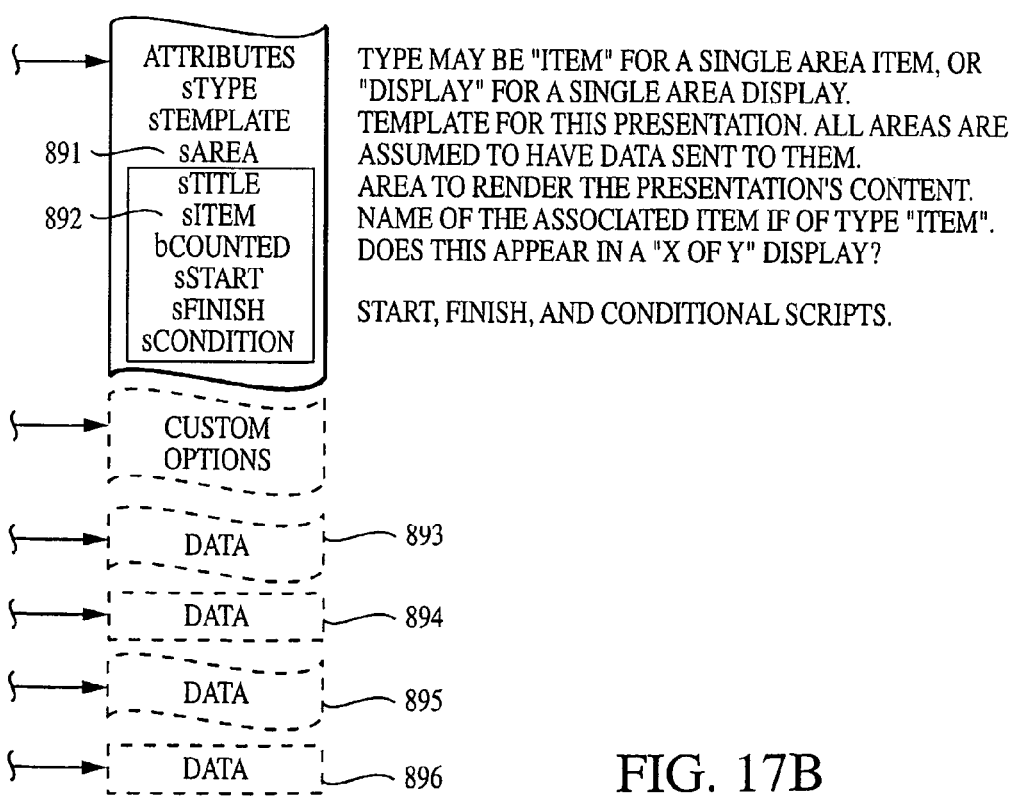
FIG. 17B

SCHEMA EXAMPLE

```
<!-- This is not defined in an element and can be used anywhere -->
<AttributeType name="name" dt:type="string" required="yes" />

<!-- A simplified version of XXL "Form" -->
<ElementType name="form" content="eltOnly" order="many" model="closed">
    <AttributeType name="restartable" dt:type="enumeration"
                   required="no"      dt:values="true false"
                   default="true" />

<attribute type="name"              />
    <attribute type="restartable"       />

<element    type="scoring"          minOccurs="0" maxOccurs="1" />

<group order="many"
        <element type="sectionRef"      minOccurs="1" maxOccurs="*" />
        <element type="section"         minOccurs="0" maxOccurs="*" />
                                        minOccurs="0" maxOccurs="*" />
    </group>

</ElementType>
```

FIG. 28

DEFINING AN ITEM

```
<ElementType name="item" content="eltOnly" order="many" model="open">
    <AttributeType  name="name"          dt:type="string"                              required="yes" />
    <AttributeType  name="title"         dt:type="string"                              required="no" />
    <AttributeType  name="template"      dt:type="string"                              required="no" />
    <AttributeType  name="area"          dt:type="string"                              required="no" />
    <AttributeType  name="weight"        dt:type="string"                              required="no" />
    <AttributeType  name="scored"        dt:type="enumeration" dt:values="true false"
                    required="no"
                    default="true" />
    <AttributeType  name="skipAllowed"   dt:type="enumeration" dt:values="true false"
                    required="no"
                    default="true" />

<attribute type="name"          />
    <attribute type="title"         />
    <attribute type="template"      />
    <attribute type="area"          />
    <attribute type="weight"        />
    <attribute type="scored"        />
    <attribute type="skipAllowed"   />

<element       type"data"           minOccurs="1"          maxOccurs="1"  />

</ElementType>
```

FIG. 29

DATA EXAMPLE

```
<data>
  <nextPrevious.bgcolor="grey">
    <button img="next.bmp"     action="next"     />
    <button img="prev.bmp"     action="previous" />
    <button img="review.bmp"   action="review"   />
  </nextPrevious>
</data>
```

DATA EXAMPLE 2

```
<xxl>

<plugin name="mainTimer" progid="UTDP.standardTimer" />

<exam name="foobar">
<form name="foobar001">
<timer name="mainTimer">
<data>
<standardTimer minutes="20">
<warning seconds="60">One Minute Left</warning>
</standardTimer>
</data>
</timer>

<!-- Rest of form definition goes here -->

</form>
</exam>

</xxl>
```

XXL REFERENCING

SECTION "JEANNIE"

DEFINES SECTION.

REFERENCES EXISTING SECTION.

REFERENCES EXISTING SECTION.

sections.xml

```
<sections name="Jeannie">
  <!-- Timer and navigation constructs go here. -->
  <group name="Jeannie_gp" template="multi">
    <!-- Selection and scoring constructs go here. -->
    <presentation item="item001" area="main" />
    <presentation item="item002" area="main" />
    <presentation item="item003" area="main" />
  </group>
</section>
``` testspec.xml

```
<form name="JoeFamily1">
  <sectionRef name="Jeannie" />
  <sectionRef name="Janice" />
  <sectionRef name="Joanne" />
  <sectionRef name="Jane" />
</form>

<form name="JoeFamily2">
  <sectionRef name="Jane" />
  <sectionRef name="PapaJoe" />
  <sectionRef name="Jeannie" />
</form>
```

EXTENSIBLE EXAM LANGUAGE (XXL) PROTOCOL FOR COMPUTER BASED TESTING

CROSS REFERENCE TO RELATED APPLICATIONS

This application is related to and is a divisional of both U.S. patent application Ser. No. 12/390,930, filed Feb. 23, 2009, and U.S. patent application Ser. No. 12/391,436, filed Feb. 24, 2009, which are both related to and are divisionals of U.S. patent application Ser. No. 10/292,911, filed Nov. 13, 2002, now U.S. Pat. No. 7,494,340, issued Feb. 24, 2009, which claims the priority of U.S. Provisional Application Ser. No. 60/331,228, filed Nov. 13, 2001, all of which are incorporated herein by reference.

This application is further related to: U.S. patent application Ser. No. 10/292,913, filed Nov. 13, 2002, now U.S. Pat. No. 7,080,303, entitled "METHOD AND SYSTEM FOR COMPUTER BASED TESTING USING PLUGINS TO EXPAND FUNCTIONALITY OF A TEST DRIVER" and having inventor Clarke Daniel Bowers; U.S. patent application Ser. No. 10/292,897, filed Nov. 13, 2002, entitled "METHOD AND SYSTEM FOR COMPUTER BASED TESTING USING CUSTOMIZABLE TEMPLATES" and having inventor Clarke Daniel Bowers; U.S. patent application Ser. No. 10/292,795, filed Nov. 13, 2002, now U.S. Pat. No. 6,966,048, issued Nov. 15, 2005, entitled "METHOD AND SYSTEM FOR COMPUTER BASED TESTING USING A NON-DETERMINISTIC EXAM EXTENSIBLE LANGUAGE (XXL) PROTOCOL" and having inventor Clarke Daniel Bowers; U.S. patent application Ser. No. 11/232,384, filed Sep. 22, 2005, now U.S. Pat. No. 7,318,727, issued Jan. 15, 2008, entitled "METHOD AND SYSTEM FOR COMPUTER BASED TESTING USING A NON-DETERMINISTIC EXAM EXTENSIBLE LANGUAGE (XXL) PROTOCOL" and having inventor Clarke Daniel Bowers; U.S. patent application Ser. No. 10/292,801, filed Nov. 13, 2002, now U.S. Pat. No. 6,948,153, issued Sep. 20, 2005, entitled "METHOD AND SYSTEM FOR COMPUTER BASED TESTING USING AN AMALGAMATED RESOURCE FILE" and having inventor Clarke Daniel Bowers; and U.S. patent application Ser. No. 11/208,471, filed Aug. 19, 2005, entitled "METHOD AND SYSTEM FOR COMPUTER BASED TESTING USING AN AMALGAMATED RESOURCE FILE" and having inventor Clarke Daniel Bowers, all of which are incorporated by reference in their entirety herein.

BACKGROUND OF THE INVENTION

1. Field of the Invention

The present invention generally relates the field of computer-based testing, and in particular, the present invention relates to a non-deterministic test definition language that defines a test specification and content of a computer-based test.

2. Background of the Related Art

For many years, standardized testing has been a common method of assessing examinees as regards educational placement, skill evaluation, etc. Due to the prevalence and mass distribution of standardized tests, computer-based testing has emerged as a superior method for providing standardized tests, guaranteeing accurate scoring, and ensuring prompt return of test results to examinees.

Tests are developed based on the requirements and particulars of test developers. Typically, test developers employ psychometricians or statisticians and psychologists to determine the specific requirements specific to human assessment. These experts often have their own, unique ideas regarding how a test should be presented and regarding the necessary contents of that test, including the visual format of the test as well as the data content of the test. Therefore, a particular computer-based test has to be customized to fulfill the client's requirements.

FIG. 1 illustrates a prior art process for computerized test customization, denoted generally by reference numeral 10. First, a client details the desired test requirements and specifications, step 12. The computerized test publisher then creates the tools that allow the test publisher to author the items, presentations, etc., required to fulfill the requirements, step 14. The test publisher then writes an item viewer, which allows the test publisher to preview what is being authored, step 16.

An item presenter is then written to present the new item, for example, to the test driver, step 18. Presenting the new item to the test driver requires a modification of the test driver's executable code. The test driver must be modified so that it is aware of the new item and can communicate with the new item presenter, step 20. The test packager must then also be modified, step 22. The test packager, which may also be a compiler, takes what the test publisher has created and writes the result as new object codes for the new syntax. Subsequently, the scoring engine must also be modified to be able to score the new item type, step 24. Finally, the results processor must be modified to be able to accept the new results from the new item, step 26. This process requires no less than seven software creations or modifications to existing software.

Current computer-based test definition languages are deterministic and finite. There is a fixed set of grammar constructs that define the extent of the language. Also, test components in current computer-based test drivers are fixed to the set of exam constructs. Therefore, new test functionality cannot be added without code changes and compilation of many modules.

U.S. Pat. No. 5,827,070 (Kershaw et al.) and U.S. Pat. No. 5,565,316 (Kershaw et al.) are incorporated herein by reference. The '070 and '316 patents, which have similar specifications, disclose a computer-based testing system comprising a test development system and a test delivery system. The test development system comprises a test document creation system for specifying the test contents, an item preparation system for computerizing each of the items in the test, a test preparation system for preparing a computerized test, and a test packaging system for combining all of the items and test components into a computerized test package. The computerized test package is then delivered to authorized examinees on a workstation by the test delivery system.

FIG. 2 illustrates the relationship among session scripts 30, test scripts 32, and units. A script consists of a series of files and further specifies the option settings and configuration data, which the Test Delivery Application (TDA) needs for operation. During test preparation, scripts are prepared and combined with the items prepared during item preparation. Scripts control the sequence of events during a testing session. Two types of scripts are preferably used: the session script 30 and one or more test scripts 32. The session script 30 controls the order in which units within the testing session are presented. Units provide specific services to the examinee, such as delivering a test or presenting a score report. Just as the session script controls the session, the test script controls what is presented to the examinee during the testing unit. Each testing unit may include one or more delivery units, which are separately timed and scored subdivisions of a test.

The system can dynamically select, or spiral, scripts and other test components so that examinees are given what appear to be different tests. FIG. 24 shows the relationship among session scripts 30, test scripts 32, and units.

The session script is the second-level component of the testing package. It performs two primary functions: First, it specifies the Session Control Information, which defines the default options that are in effect for the entire examinee testing session. Second, it controls the order in which units within the testing session are presented and the options used to present them. The units that can be presented within a session script are: General information screen units, Tutorial units, Break units, Data collection units, Scoring and reporting units, and Testing units.

The session control information contains the default options in effect for the entire session. Control information can be provided at multiple levels within the testing session. Thus, the control information provided at the session level can be overridden by information that occurs later in the session. The information provided at the session level would generally include the following: Name—the session script name to be used by administrators in selecting a specific session script from Administrative Application menus; Input device—the input device to be used during the session (e.g., mouse or keyboard); Color—the colors to be used during the session; Messages—program-specific messages to override default messages during the session; Demo Script—indicates whether the script presents a demonstration or operational test; Research Indicator—indicates whether the script presents a research pilot test; Special Timing—indicates whether the script is standard or specially timed version.

The testing unit presents a test, based on the contents of a test script that may have been selected at runtime. The following units can be included within a testing unit: general information screen unit; tutorial unit; break unit; delivery unit, which delivers items to the examinee. This permits testing programs to interleave general information screens, tutorials, and breaks with sections of a test. The testing unit contains the following information: script selection mode indicates whether dynamic runtime selection is to be used to select the test script; reference to a test script which controls the sequence of events and options used during the testing unit. If dynamic runtime selection is to be used, the reference is to a set of test scripts. Like the session script, the test script performs two primary functions. First, it specifies the test and delivery unit control information. Test control information defines the options that are in effect for the testing unit. Delivery unit control information defines the options that are in effect for a particular delivery unit within a testing unit. It controls the order in which units are presented within the testing unit and the options used to present them. The rules for presentation of units are the same as those for the session script, except that an additional unit, the delivery unit, can be included within a test script.

U.S. Pat. No. 5,513,994 (Kershaw et al.), which is incorporated herein by reference, discloses a centralized administrative system and method of administering standardized test to a plurality of examinees. The administrative system is implemented on a central administration workstation and at least one test workstation located in different rooms at a test center. The administrative system software, which provides substantially administrative functions, is executed from the central administration workstation. The administrative system software, which provides function carried out in connection with a test session, is executed from the testing workstations.

None of the Kershaw et al. patents appear to make any mention of a test definition language that is non-linear and does not require interpretation of the commands at delivery time. What is required is a non-deterministic test definition language that is able to expand with the definition of new testing components and allows the test driver to be expanded to support new item types, scoring algorithms, etc., without making any changes to the test driver's executable or recompiling the test driver to support the new testing components as described below in connection with the present invention. Other features and advantages in addition to the above, or in the alternative to the above, are described in the Summary of the Invention and the Detailed Description provided below.

SUMMARY OF THE INVENTION

It is one feature and advantage of the present invention to implement a test definition language that allows the addition of new test functionality without necessitating changes to a test driver's executable code or other implementing functionality.

It is another optional feature and advantage of the present invention that a test definition language used to implement a computer-based test supports, for example, a non-predetermined properties set.

It is another optional and advantage of the present invention that the test definition language used to implement a computer-based test supports named properties to, for example, any area of the test definition.

It is another optional and advantage of the present invention that the test definition language used to implement a computer-based test is in extensible markup language format and optionally has a grammar that is defined by a schema.

These and other advantages are achieved in an optional memory storing a test definition language in extensible markup language format that characterizes or comprises a computer-based test delivered to an examinee using a test driver and is implemented by a computer. The test definition language has, for example, a plurality of segments. The computer-based test has a presentation format and data content and the test driver delivers the computer-based test to an examinee using a display device. The test driver, for example, manages the computer-based test, controls progression of the computer-based test, controls scoring of the computer-based test, controls timing of the at least one test, controls printing of the at least one test, and controls results reporting of the computer-based test based on the test definition language.

The optional memory stores a plurality of first data structures. The plurality of first data structures includes element specific data objects indicating a classification of at least one of the plurality of segments of the test definition language. The plurality of segments defines information comprises the data content, the presentation format, the progression, the scoring, the printing, the timing, and the results reporting of the computer-based test. The memory also stores second data structures that optionally depend from or are subordinate to the first data structures. The second data structures include attribute specific data objects indicating at least one attribute of the segments of the test definition language implemented by the computer.

In an alternative embodiment, the memory further stores third data structures that depend from or are subordinate to the plurality of first data structures. The third data structures include data specific data objects indicating at least one sub-classification of the at least one of the plurality of segments of the test definition language.

In another alternative embodiment, the memory further stores third data structures that depend from or are subordinate to the plurality of first data structures. The plurality of third data structures include element specific data objects indicating a sub-classification of the at least one of the plurality of segments of the test definition language. The sub-classification further indicates at least one property specific to the at least one of the plurality of segments of the test definition language.

In a further alternative embodiment, the memory further stores fourth data structures that depend from or are subordinate to the plurality of first data structures. The plurality of fourth data structures include group specific data objects indicating an order of an appearance of the at least one of the plurality of third data structures, a minimum occurrence of the appearance of the at least one of the third data structures, and a maximum occurrence of the appearance of the at least one of the third data structures.

In another embodiment of the present invention, a memory is provided storing a schema for a test definition language in extensible markup language format that that characterizes a computer-based test delivered to an examinee using a test driver and is implemented by a computer. The test definition language has a plurality of segments. The computer-based test has a presentation format and data content and the test driver delivers the computer-based test to an examinee using a display device, manages the computer-based test, controls progression of the computer-based test, controls scoring of the computer-based test, controls timing of the at least one test, controls printing of the at least one test, and controls results reporting of the computer-based test based on the test definition language, wherein the schema defines a permissible grammar for the test definition language.

An optional memory stores a plurality of first data structures. The plurality of first data structures includes element definition specific data objects defining an element classification of at least one of the plurality of segments of the schema. The plurality of segments defines classification identification information comprising the data content, the presentation format, the progression, the scoring, the printing, the timing, and the results reporting of the computer-based test. The memory also stores second data structures. The second data structures include attribute definition specific data objects defining at least one attribute classification of the plurality of segments of the schema.

The memory further stores third data structures. The third data structures include element specific data objects indicating at least one element sub-classification of the at least one of the plurality of segments of the schema. The memory also stores fourth data structures. The fourth data structures include attribute specific data objects indicating at least one attribute of the at least one of the plurality of segments of the test definition language implemented by the computer.

In another embodiment of the present application, a method for computer-based testing is provided, which includes authoring a test specification and content of the at least one test using a test definition language. The test specification and content defines the presentation format and the data content of the at least one test. The method also includes compiling the test specification and content of the at least one test to create a compiled test specification and content. Compiling the test specification and content includes validating the test specification and content. The method further includes storing the compiled test specification and content to a resource file and retrieving the compiled test specification and content from the resource file during delivery of the test.

In another embodiment of the present invention, a method for defining a schema for a test definition language is provided. The method includes defining a first set of elements, defining a set of attributes, and defining a second set of elements. The second set of elements references the first set of elements and the set of attributes.

In another embodiment of the present invention, a method is provided for a computer-based testing system that executes a test controlled by a test driver. The test driver has an executable code that controls the test driver and functionality performed by the test driver that enables the test driver to deliver the at least one test to an examinee using a display device, manage the at least one test, control progression of the at least one test, control scoring of the at least one test, control timing of the at least one test, control printing of the at least one test, and control results reporting of the at least one test based on a test definition language in extensible markup language format. The test has a presentation format and data content. The test definition language has a plurality of segments that defines information comprising the data content, the presentation format, the progression, the scoring, the printing, the timing, and the results reporting of the test.

The method includes the sequential, non-sequential and/or sequence independent steps of authoring at least one of the plurality of segments and storing the at least one of the plurality of segments to the source file. The method also includes instantiating a validation expansion module during a test production cycle and loading the at least one of the plurality of segments of the test definition language into a memory from the source file, validating the at least one of the plurality of segments. The method further includes unloading the at least one of the plurality of segments from the memory into at least one of a plurality of storage elements and providing to the memory the at least one of the plurality of storage elements. The method also includes loading the at least one of the plurality of segments of the test definition language from the at least one of the plurality of storage elements into the memory during a test delivery cycle and implementing directly by the validation expansion module the information defined by the at least one of the plurality of segments. The method further includes accessing by the test driver the at least one of the plurality of segments of the test definition language to enable the functionality of the test driver via the direct implementation by the validation expansion module.

In another embodiment of the present invention, the test definition language has a plurality of element specific data objects and a plurality of attribute specific data objects that define information comprising the data content, the presentation format, the progression, the scoring, the printing, the timing, and the results reporting of the test.

The method includes the sequential, non-sequential and/or sequence independent steps of authoring at least one of the plurality of element specific data objects and at least one of the plurality of attribute specific data objects and storing the at least one of the plurality of element specific data objects and the at least one of the plurality of attribute specific data objects to the source file. The method also includes instantiating a validation expansion module during a test production cycle, loading the at least one of the plurality of element specific data objects and the at least one of the plurality of attribute specific data objects of the test definition language into a memory from the source file. The method further includes validating the at least one of the plurality of element specific data objects and the at least one of the plurality of attribute specific data objects and unloading the at least one of the plurality of element specific data objects and at least one of the plurality of attribute specific data objects from the memory into at least one of a plurality of storage elements.

The method also includes providing to the memory the at least one of the plurality of storage elements and loading the at least one of the plurality of element specific data objects and the at least one of the plurality of attribute specific data objects of the test definition language from the at least one of the plurality of storage elements into the validation expansion module during a test delivery cycle. The method further includes implementing directly by the validation expansion module the information defined by the at least one of the plurality of element specific data objects and at least one of the plurality of attribute specific data objects and accessing by the test driver the at least one of the plurality of element specific data objects and at least one of the plurality of attribute specific data objects of the test definition language to enable the functionality of the test driver via the direct implementation by the validation expansion module.

There has thus been outlined, rather broadly, the more important features of the invention and several, but not all, embodiments in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These, together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 2 is a block diagram of a prior art testing script;

FIGS. 17A, 17B, 17C, and 17D are block diagrams illustrating an events sub-branch of the groups branch of the exam resource file;

FIG. 28 illustrates an example of a schema according to the present invention;

FIG. 29 illustrates an example of a schema definition of an item according to the present invention;

FIG. 33 illustrates and example of using the test definition language to define plugin data; and FIG. 34 illustrates test definition language referencing according to the present invention.

DETAILED DESCRIPTION OF THE PREFERRED EMBODIMENTS

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The present invention discloses a system and method OF computer-based testing using a non-deterministic test language. A test is delivered using a test driver that is, for example, object-oriented and is architected to dynamically add functionality through, for example, the use of an expansion module, and preferably through the use of plugins. The test driver preferably references component object model servers using standard interfaces, and uses, for example, class names (that can be an Active Document) defined in a custom test definition language entitled extensible eXam Language ("XXL") based on eXtensible Markup Language ("XML") format to interact with existing applications while offering the flexibility of allowing development of new plugins. These new plugins can be customized to a client's needs without changing the core test driver. The XXL language is defined using an XXL schema that structures the allowable grammar of the XXL language.

The plugins advantageously enable the test driver to support, for example, new item types, navigation algorithms, information displays, scoring algorithms, timing algorithms, test unit selection algorithms, results persistence reporting, printed score reporting, and/or helm types without change to the test driver's executable. Plugins also allow expansion of the test driver's functionality without requiring the test driver to be recompiled or re-linked, and without requiring the test publisher to learn to program. Since plugins are written independently of the test driver, plugins can be written long after the test driver is built.

The client and the software developer can design and test the plugins and distribute the plugins to each test site. By using this method, large-scale regression testing of other examinations will not usually be necessary unless changes are made to the plugins that may be used by many examinations.

I. Overview of Computer-Based Test Delivery System

Figure 1:
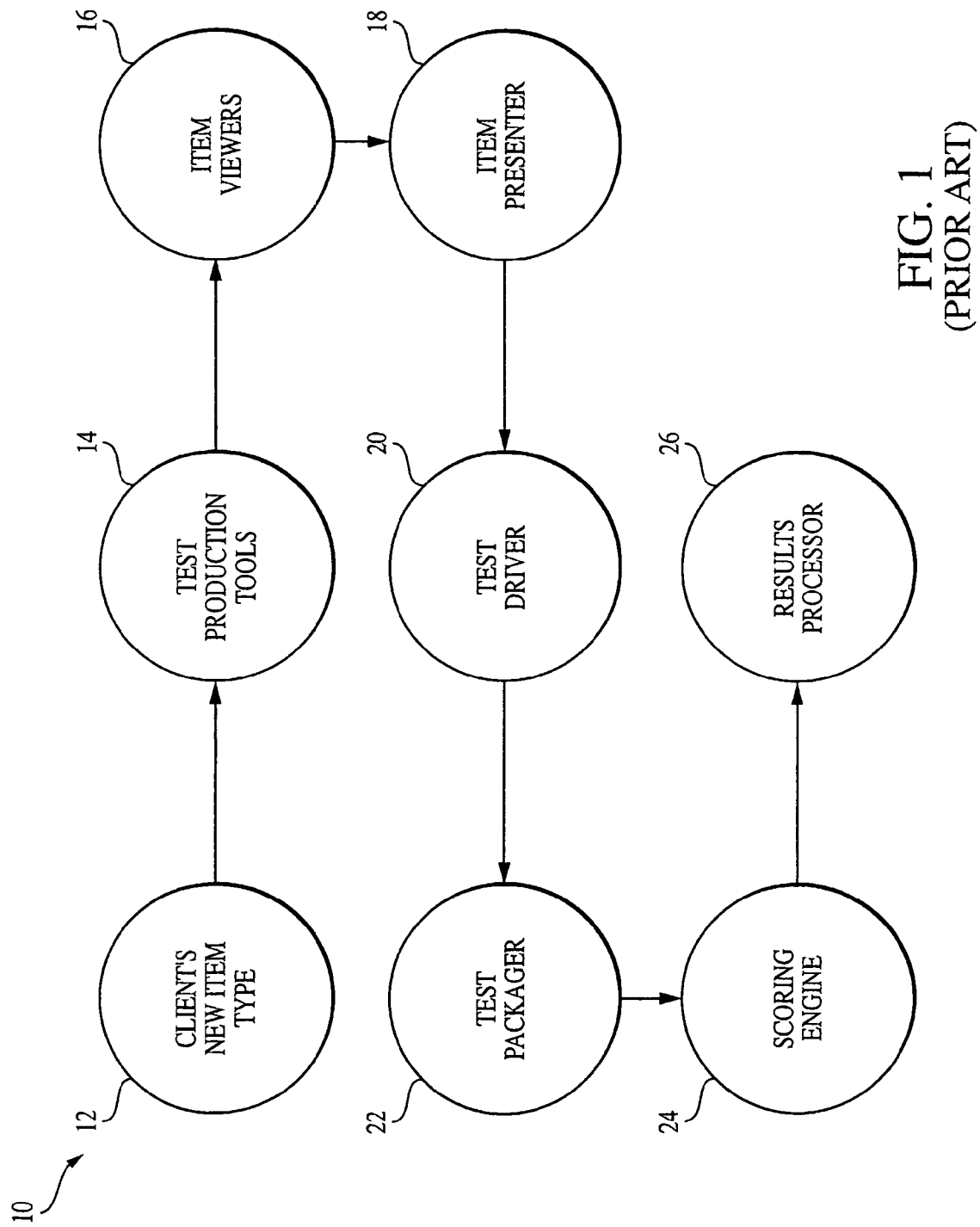
FIG. 1 is a flow diagram of a prior art method for computerized test customization.
Figure 3:
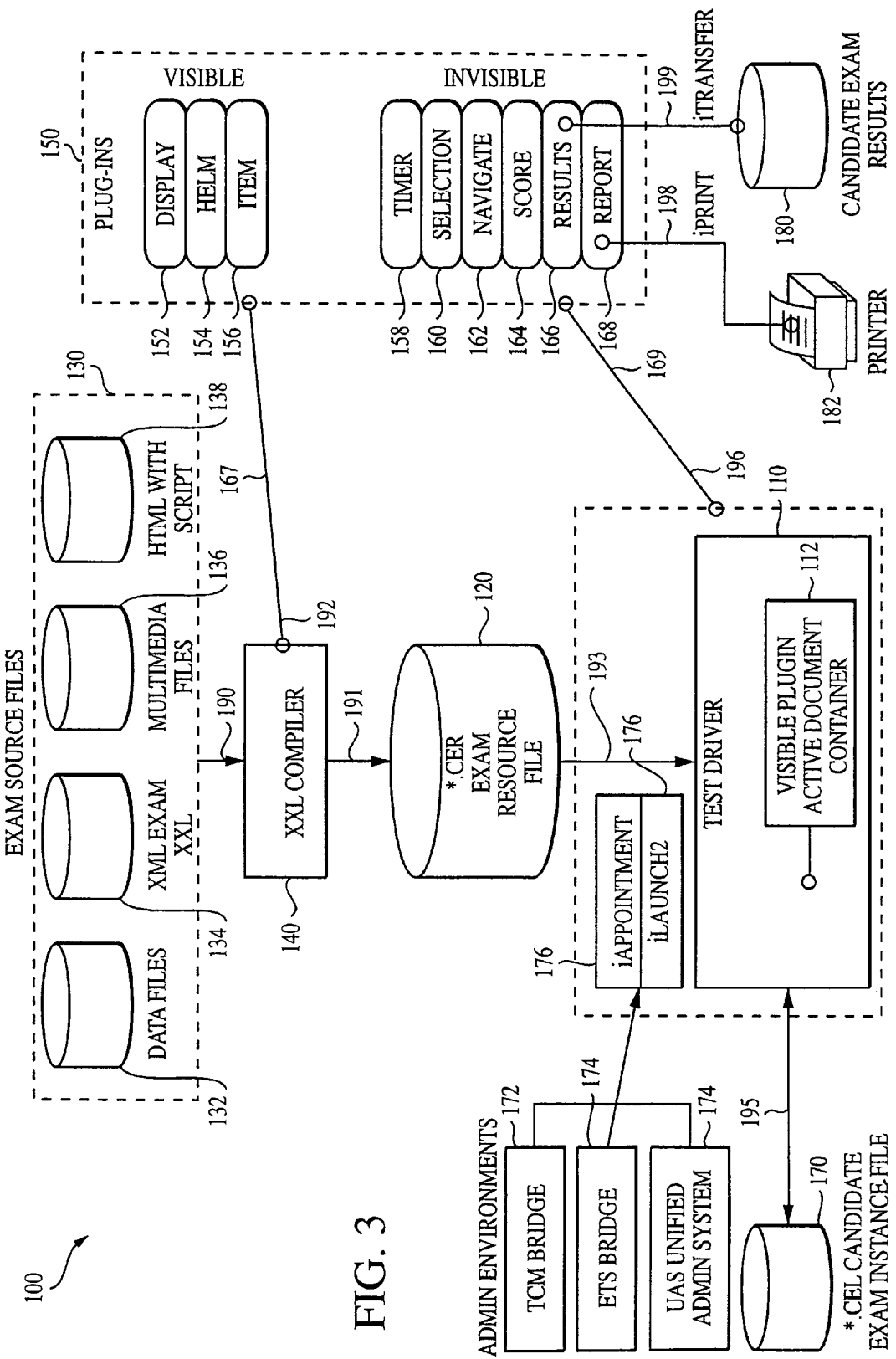
FIG. 3 is a schematic diagram of a computer-based testing system according to the present invention.

FIG. 3 shows an overview of the software architecture for the computer-based test delivery system of the present invention, denoted generally by reference numeral 100. Test driver 110 is responsible for controlling all aspects of the computer-based test. Test driver 110 identifies examinees scheduled to take the computer-based test and identifies and creates the appropriate test. Test driver 110 then presents all of the test components to examinees using a display device (not shown), such as a computer monitor, and enables examinees to enter responses to test questions through the use of an input device (not shown), such as a keyboard, a mouse, etc. Test driver 110 also monitors the security of the test. For example, test driver 110 can prevent access to the Internet and can validate examinees, although, these functions are preferably performed by the test center administration system. Test driver 110 also monitors the timing of the test, providing relevant warnings to examinee regarding the elapsed time of the test and the time remaining for a particular section of the test or for the entire test. Test driver 110 is also responsible for scoring the test, once the test is completed or while the test is in progress, and for reporting the results of the test by physical printout using printer 182 or in a file format using candidate exam results file 180. If the test is interrupted while in progress for example, due to a power failure, test driver 110 restarts the test, preferably at the point at which the test was interrupted, as will be described subsequently in more detail. Finally, if the test is left incomplete, test driver 110 cleans up the incomplete test. An incomplete test will have an exam instance file in the examinee's directory but will not have created a results file. A results file is created even though generally the candidate will fail. The number of items delivered to the examinee is recorded in the results file. Test drive 110 picks up where the event was interrupted and invisibly deliveries the rest of the units of the test.

A test specification is authored by a test publisher according to the specifications of the client and stored in exam source files 130. Exam source files 130 include data files 132, XXL files 134, multimedia files 136, and hypertext markup language ("HTML") files 138. XXL files 134 include the test specification, which contains the client's requirements for the test, a bank of test items or questions, templates that determine the physical appearance of the test, plugins, and any additional data necessary to implement the test. Additional data is also stored in data files 132. For example an adaptive selection plugin may need a, b & c theta values. These values are stored in a binary file created by a statistical package.

HTML files 130 include, for example, any visual components of the test, such as the appearance of test items or questions, the appearance of presentations on the display device, the appearance of any client specified customizations, and/or the appearance of score reports. HTML files 130 preferably also include script, for example, VBscript and Jscript, or Java script. HTML files 130 are preferably authored using Microsoft's FrontPage 2000. FrontPage 2000 is preferably also used to manage the source files in a hierarchy that is chosen by the test publisher. Multimedia files 136 include, for example, any images (.jpg, .gif, etc.) and/or sound files (.mp3, .wav, .au, etc.) that are used during the test.

XXL compiler 140 retrieves XXL files 134 from exam source files 130 using interface 190 and compiles the XXL test content stored in XXL files 134. XXL compiler 140 stores the compiled test files in exam resource file 120. In another embodiment, exam source files 130 do not contain XXL files 134 and contains, for example, only multi-media files. In this embodiment, XXL compiler 140 is merely a test packager that writes the data directly to exam resource file 120 without modification or validation. The data appears in a stream under the "data" branch of exam resource file 120. The name of the steam is specified by the test author.

In a preferred embodiment, XXL files 134 also include XXL language that defines plugins 150, in which case, plugins 150 assist XXL compiler 140 in compiling XXL files 134. Test driver 110 preferably supports, for example, nine different types of plugins 150, including, for example: display plugin 152; helm plugin 154; item plugin 156; timer plugin 158; selection plugin 160; navigation plugin 162; scoring plugin 164; results plugin 166; and report plugin 168. Plugins 150, which are also included in XXL files 134, are the first XML files compiled into exam resource file 120.

Exam resource file 120 receives the compiled test content from XXL compiler 140 and plugins 150, if applicable, and stores the compiled test content in an object-linking and embedding ("OLE") structured storage format, called POLESS, which is described in greater detail below. Other storage formats may optionally be used. OLE allows different objects to write information into the same file, for example, embedding an Excel spreadsheet inside a Word document. OLE supports two types of structures, embedding and linking. In OLE embedding, the Word document of the example is a container application and the Excel spreadsheet is an embedded object. The container application contains a copy of the embedded object and changes made to the embedded object affect only the container application. In OLE linking, the Word document of the example is the container application and the Excel spreadsheet is a linked object. The container application contains a pointer to the linked object and any changes made to the linked object change the original linked object. Any other applications that link to the linked object are also updated. POLESS supports structured storage such that only one change made to an object stored in exam resource file 120 is globally effective. Test driver 110 comprises Active Document container application 112 for the visible plugins, display plugin 152, helm plugin 154, and item plugin 156, which function as embedded objects, preferably COM objects.

Both XXL compiler 140 and plugins 150 are involved in storing the compiled test content into exam resource file 120, if any of plugins 150 are being used. Exam resource file 120 comprises, for example, a hierarchical storage structure, as will be described in further detail below. Other storage structures may optionally be used. XXL compiler 140 determines to which storage location a specific segment of the compiled test content is to be stored. However, if any of plugins 150 are used to validate the portion of any of the data from exam source files 130, then the plugins 150 store the data directly to the exam resource file, based upon directions from XXL compiler 140. XXL compiler uses IPersistResource interface 192, co-located with I-Plugin interface 167 in FIG. 3, to control the persistence of the data to exam resource file 120. XXL compiler 140 and plugins 150 write the data to exam resource file 120 using POLESS interfaces 192.

Figure 4:
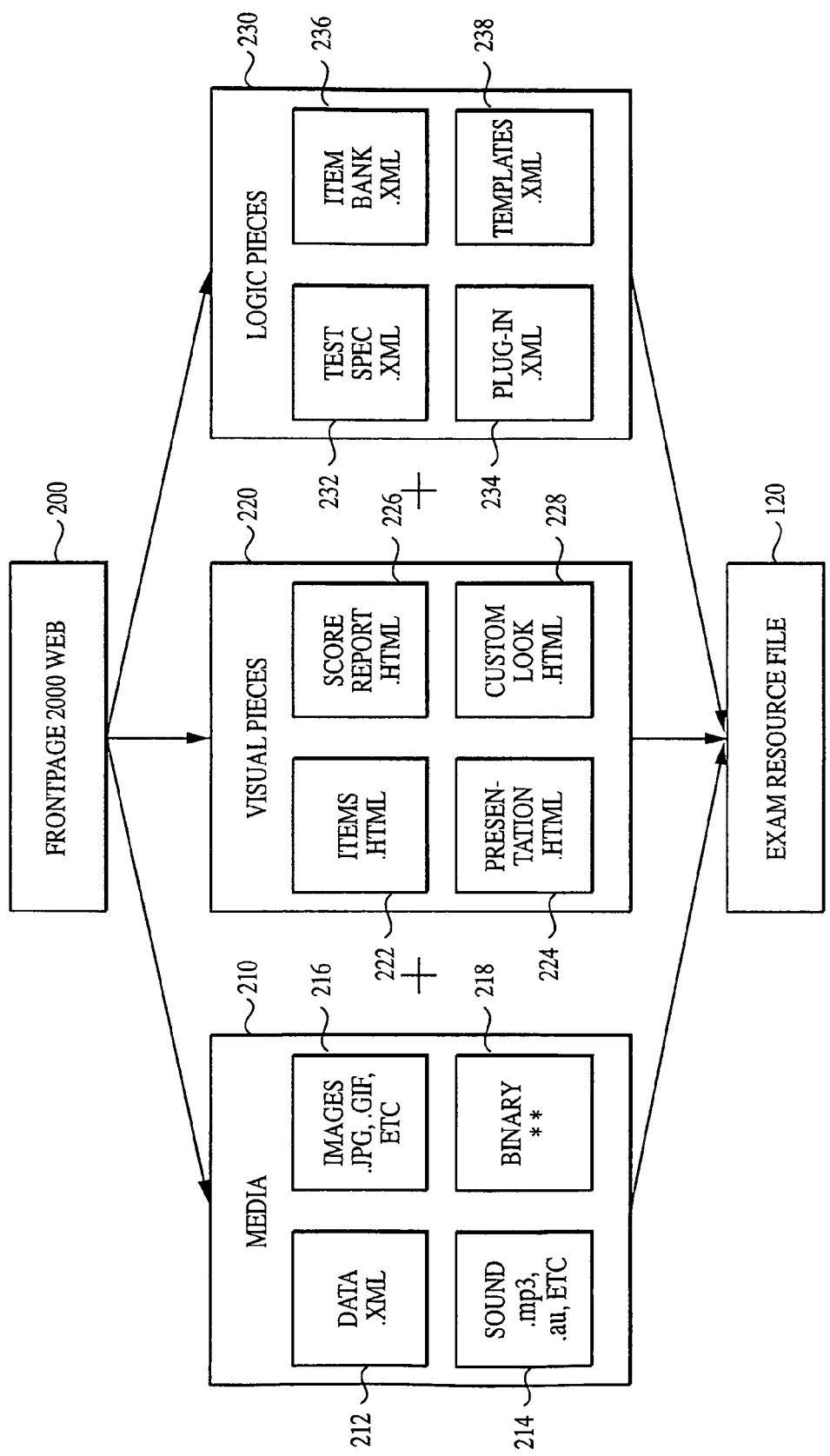
FIG. 4 illustrates various components that comprise an exam source file.

FIG. 4 illustrates the contents of exam source file 130, which are compiled into exam resource file 120 by XXL compiler 140 and plugins 150. FrontPage 2000 Web 200 is used, for example, to author the test. Exam source files 130 contain media files 210, visual files 220, and logic files 230. Media files 210 are multimedia files used to enhance the presentation of the test, including, for example, XML data files 212, sound files 214, image files 216, and binary files 218. XML data files 212 include the XXL test definition language and the XXL extensions from the plugins 150 that use XML. The test specification, presentation, scoring and other information is specified in the XML files. Sound files 214 include any sounds that are to be used during the test, such as .mp3 files, .au files, etc. Image files 216 include any images to be used during the test, such as .jpg files, .gif files, etc. Binary files 218 include any data needed by a plugin 150 that is not in XXL format. Visual files 220 are HTML files that specify the visual presentation of the test as presented to the examine on the display device, including items files 222, presentation files 224, score report files 226, and custom look files 228. Items files 222 include HTML files that are used to specify the visual component of test questions, e.g., stems and distractors. Items files 222 are capable also of referencing external exhibits. An exhibit could be a chart, diagram or photograph. Formats of exhibits include, for example: .jpg, .png, etc. Presentation files 224 define what is seen by the examinee on the display device at a particular instant during the test. Score report files 226 is typically an HTML file with embedded script that includes, for example candidate demographics, appointment information, and candidate performance. The performance might include pass/fail, achievement in different content areas, etc. Custom look files 228 are typically HTML files with embedded script to layout, for example, the title bar and information contained therein. Logic files 230 are XML files that specify the functional aspects of the test, including test specification files 232, plugin files 234, item bank files 236, and template files 238. Test specification files 232 specify the content and progression of the test as provided by the client. Plugin files 234 define plugins 150 and contain any data necessary to implement plugins 150. Item bank files 236 include the data content and properties of the items, or test questions, that are to be presented to the examinee during the test. Properties of an item include the correct answer for the item, the weight given to the item, etc. Template files 238 define visual layouts that are used with the display screen during the test.

Referring again to FIG. 3, once a test has begun, test driver 110 accesses exam resource file 120 for the instructions and files needed to implement the test, using POLESS interfaces 193. Test driver 110 also access plugins 150 for additional data that expands the functionality of test driver 110 in the areas of items, navigation algorithms, information displays, scoring algorithms, timing algorithms, test unit selection algorithms, results persistence reporting, printed score reporting, and/or helm types. Test driver 110 communicates with plugins 150 using various COM interfaces 169. COM interfaces facilitate OLE linking. As stated previously, test driver 110 is an Active Document container application and plugins 150 are embedded objects. The COM interfaces function as communications paths between the container application and the objects.

There are, for example, ten COM interfaces utilized in computer-based test delivery system 100. IPlugin interface 167, which is also a COM interface, is supported by all of plugins 150. COM interfaces 169, therefore, includes the IPlugin interface. The IPlugin interface contains generic operations such as loading and unloading required of all plugins 150. In addition to the global IPlugin interface, each plugin 150 also uses, for example, a second, individual COM interface 169 to communicate with test driver 110. Alternative structures of the IPlugin interface may also be used. Table 1 shows the relationship between each plugin 150 and the COM interface 169 used with that particular plugin 150.

TABLE 1

| COM INTERFACE FOR PLUGINS | | |
|---|---|---|
| PLUGIN | COM INTERFACE | DESCRIPTION |
| All Plugins 150 | IPlugin | Passes data between the test driver and all plugins regarding generic operations, e.g., loading and unloading. |
| Display 152 | IDisplay | Passes data between the test driver and the visible plugins that handle title bars, displays, non-answered items, and summaries. |

TABLE 1-continued

COM INTERFACE FOR PLUGINS

| PLUGIN | COM INTERFACE | DESCRIPTION |
| --- | --- | --- |
| Helm 154 | IHelm | Passes data between the test driver and the visible plugins that display navigation controls or reviews. Communicates with a navigation plugin to perform the actual navigation. Also functions as a user interface connection to the test driver. |
| Item 156 | IItem | Passes data between the test driver and the visible plugins that govern test items or simulations. |
| Timer 158 | IUnitTimer | Passes data between the test drivers and the invisible plugins used to perform timing across examination sections. |
| Selection 160 | ISelection | Passes data between the test drivers and the invisible plugins used to select forms, sections, groups, or items for delivery to the examinee. |
| Navigation 160 | INavigate | Passes data between the test drivers and the invisible plugins used to control section navigation and define rules for traversing through the test. |
| Scoring 164 | IScore | Passes data between the test drivers and the invisible plugins used to control scoring of delivered testing units. |
| Results 166 | IResults | Passes data between the test drivers and the invisible plugins that control writing of examinee results, for example, to candidate exam results file 180. |
| Report 168 | IReport | Passes data between the test drivers and the invisible plugins that control printing of score reports and other material, for example, printed reference material and post exam instructions to printer 182. |

Exam instance file 170 is used to restart a test if the test has been interrupted, for example, because of a power failure. During delivery of the test, exam instance file 170 receives examination state information from test driver 110 and plugins 150 regarding the state of all running objects being used to deliver the test. The examination state information includes the presentation that was being delivered on the display device before the interruption, the responses the examinee had entered in that presentation, etc. When the test is restarted, the exam instance file 170 loads the state information back to test driver 110 and plugins 150, allowing the test to return to operation at the point where the test had been interrupted. Preferably, the running state of all objects is saved to exam instance file 170 rather than of only some of the objects. Saving the state of only some of the objects to exam instance file 170 causes the potential problem of only a portion of the test information being restored after a test interruption. Exam instance file 170 may also store additional information relating to the test, including, for example: the timing utilized and time remaining on units of the exam, the current unit of delivery, candidate score, etc. Test driver 110 and plugins 150 communicate with exam instance file 170 using POLESS interfaces 195. Test driver 110 controls communication between test driver 110 and plugins 150 using IPersistInstance interface 196, which is collocated with COM interfaces 169 in FIG. 3.

Several administrative environments perform the administrative functions of computer-based test delivery system 100, for example: Test Center Manager ("TCM") Bridge 172; Educational Testing Service ("ETS") Bridge 174; and Unified Administration System ("UAS") 174. Administrative functions include, for example: checking-in an examinee, starting the test, aborting the test, pausing the test, resuming the test, and transmitting results.

There are preferably two ways to run Test driver 110. The first is through a series of command line options and the second is using COM interfaces describing appointment information. The command line option exists for backwards compatibility in a standard ETS environment and a TCM environment. Table 2 shows a list of command line options test driver 110 supports. There are, for example, four programs which launch the test through the COM interface, for example: 1) LaunchTest.exe (for test production and client review); 2) UAS; 3) UTD2ETS.dll (an internal compatibility module for use with the ETS administration environment); and 4) UTD2TCM (for the Test Center Manger environment). Other number of environments and/or programs may optionally be used.

| Switch(es) | Option(s) | Purpose |
| --- | --- | --- |
| /? /help | n/a | Displays command line switches in dialog box. |
| /UnregServer | n/a | Unregisters the Test driver core COM server. |
| /Regserver | n/a | Registers the Test driver core COM server. |
| /T | form name | Name of the form or form group to run in the exam. |
| /F | resource file | The exam resource file to use. |
| /S | n/a | Suppress any printing. |
| /W | n/a | Run in close-of-day mode. |
| /TI | n/a | Set tracing level to information. (Very large instance file). |
| /TW | n/a | Set tracing level to warning. (Large instance file.) |
| /TE | n/a | Set tracing level to error. (Average sized instance file.) |
| /K | resource dir, SKSID, | Used to point to directories. A space separates each of the three options. |

| Switch(es) | Option(s) | Purpose |
|---|---|---|
| | candidate director | |

The administration environments use several interfaces to communicate with test driver 110. IAppointment interface 176 is part of UAS 174 and allows access by test driver 110 to examinee information for the examinee taking the test, such as demographics. The examinee information is included in candidate exam results file 180, which is created by the test driver. ILaunch2 interface 177 functions as the primary control interface for UAS 174 and allows UAS 174 to control various components such as test driver 110, screen resolution change, accommodations for disabled candidates, examinee check-in, etc., in a test center, which is the physical location where the examinee is taking the test. ITransfer interface 199 transfers candidate exam results file 180 and other files back to UAS 174. IPrint interface 198 sends information regarding any reports to printer 182.

II. Compilation of Exam Source Files

A. XXL Compiler Interfaces and Classes

Figures 5, 5A:
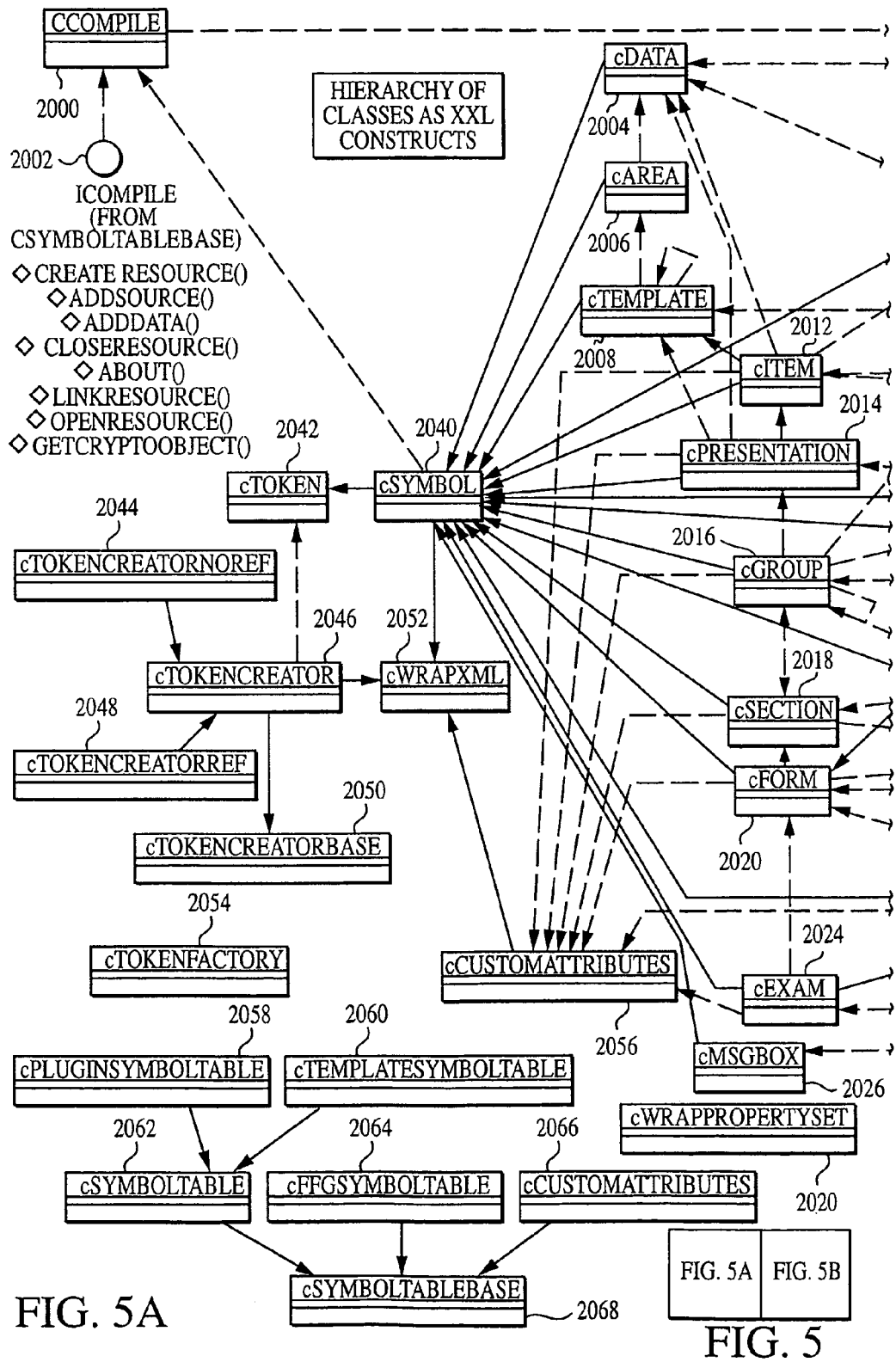
FIGS. 5A and 5B are schematics illustrating the components, classes, and interfaces that comprise a test definition language compiler according to the present invention.
Figure 5B:
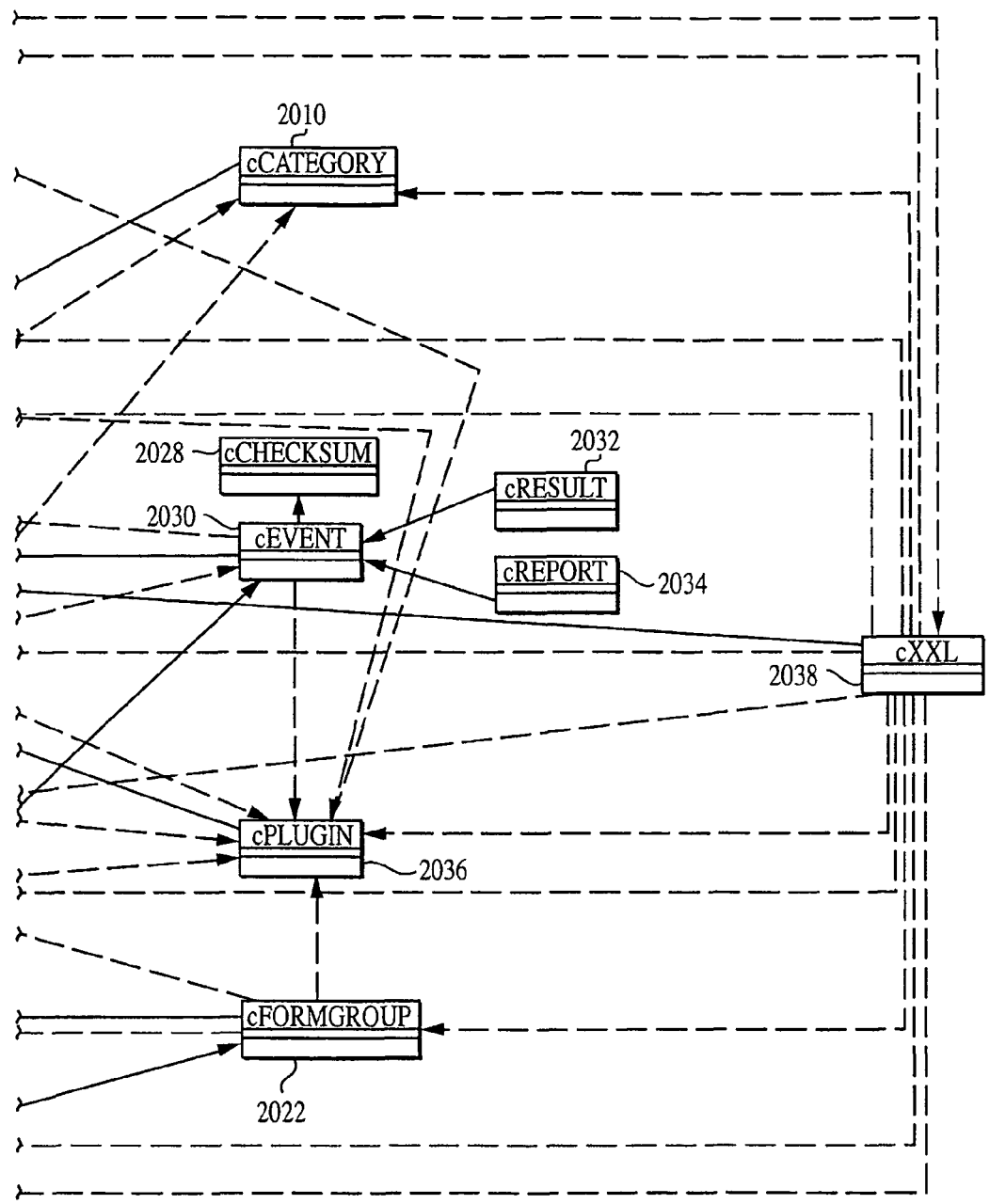

FIGS. 5A and 5B illustrate the main diagram for XXL compiler 140. XXL compiler 140 comprises the following classes, for example: cCompile 2000; cData 2004; cArea 2006; cTemplate 2008; cCategory 2010; cItem 2012; cPresentation 2014; cGroup 2016; cSection 2018; cForm 2020; cFromGroup 2022; cExam 2024; cMsgBox 2026; cCheck-sum 2028; cEvent 2030; cResult 2032; cReport 2024; cPlugin 2036; and cXXL 2038.

The main interface to XXL compiler 140 is ICompile interface 2002. ICompile interface 2002 is implemented by cCompiler class 2000. All control and initiation of compilation of exam source files 130 into exam resource file 120 occurs by way of this single public interface. The core, non-plugin related elements of the XXL test definition language, as stored in XXL files 134, are compiled by classes in XXL compiler 140. For example, cSection class 2018, compiles the section element, and cGroup class 2016 compiles the group element.

ICompile interface 2002 supports the following operations, for example: createResource( ); addSource( ); addData( ); closeResource( ); about( ); linkResource( ); openResource( ) and getCryptoObject( ). CreateResource( ) creates a resource file, for example, an XXL based resource file such as exam resource file 120. AddSource( ) compiles an XXL file into the resource file. AddData( ) adds a file directly to a data branch of the resource file. CloseResource( ) closes the resource file. LinkResource( ) links a resource in the resource file and is performed after all compiling of the source files are completed. GetCryptoObject( ) returns an ICrypto object containing the current encryption setting of POLESS, as described below.

The classes of XXL compiler 1040, e.g., cForm 2020 and cItem 2012, handle individual XXL core language elements. All of these classes compile the specific XXL source element into exam resource file 120. All of these class language elements are also symbols used in later references. Therefore, the classes all derive from cSymbol class 2040. cSymbol class 2040 allows the classes of XXL compiler 140 to reside in a symbol table.

For example, the XXL element plugin 150 appears as follows in XXL files 134:

```
<plugin name="helmNextPrevious"
    progid="UTDP.cNextPrevious"  />
```

This XXL call causes an instance of cPlugin class 2036 to be created, compiles the source, and writes the compiled result to exam resource file 120. The name and ID of Plugin 150 is also added to the symbol table for later reference.

XXL compiler 140 also contains the following token classes, for example: cToken 2042; cTokenCreatorNoRef 2044; cTokenCreator 2046; CtokenCreatorRef 2048; cTokenCreatorBase 2050; and cTokenFactory 2054. These token classes are involved in the identification of tokens. Tokens turn into symbols after identification. Symbols are any class derived from cSymbol, e.g., cTemplate, cSection, etc.

XXL compiler 140 also contains the following symbol table classes, for example: cPluginSymbolTable 2058; cTemplateSymbolTable 2060; cSymbolTable 2062; cFFGSymbolTable 2064; cSGPSymbolTable 2066; and cSymbolTableBase 2068. These classes are varieties of symbol tables. There are different symbol tables for different groups of symbols. A group of symbols define a name space for the symbol. Common symbol table functions are located in the base symbol table classes and templates.

All content and specification destined for a plugin 150 appears in the data element in XXL. For example, below is an item definition in XXL:

```
<item name="wantABreak1" skipAllowed="false">
    <data>
        <multiChoice
            correctAnswer="A"
            maxResponses="1"
            minResponses="1"
            autoPrompt="false"
            URI="itembank/info_item.htm#wantABreak"/>
    </data>
</item>
```

The item element is handled by a cItem class 2012 object. The data element in the XXL definition is handled by a cData class 2004 object. Item plugin 156 Plugin 150 will receive the source to compile from the cData class 2004 object, in this example, a multiChoice element.

cWrapXML class 2052, a wrapper class for XML DOM nodes, supports error handling. cCustomAttributes class 2056 compiles the custom attributes XXL element. cWrapPropertySet class 2070 is a wrapper class for a POLESS property storage.

B. Order of Compilation

The test publisher advantageously and optionally is not forced to combine the entire test specification and content of the test into a single file. Rather the test publisher is encouraged to break apart exam source files 130 to allow for maximum reuse between tests. Therefore, in accordance with one embodiment, in a single XXL source file, the order of the elements is enforced by XXL compiler 140 with the symbol tables. In alternative embodiments, more than one source file may be used. An element defined in the test specification and content or an attribute of an element is preferably and optionally defined before it is referenced by the element or by a sub-element.

Figure 6:
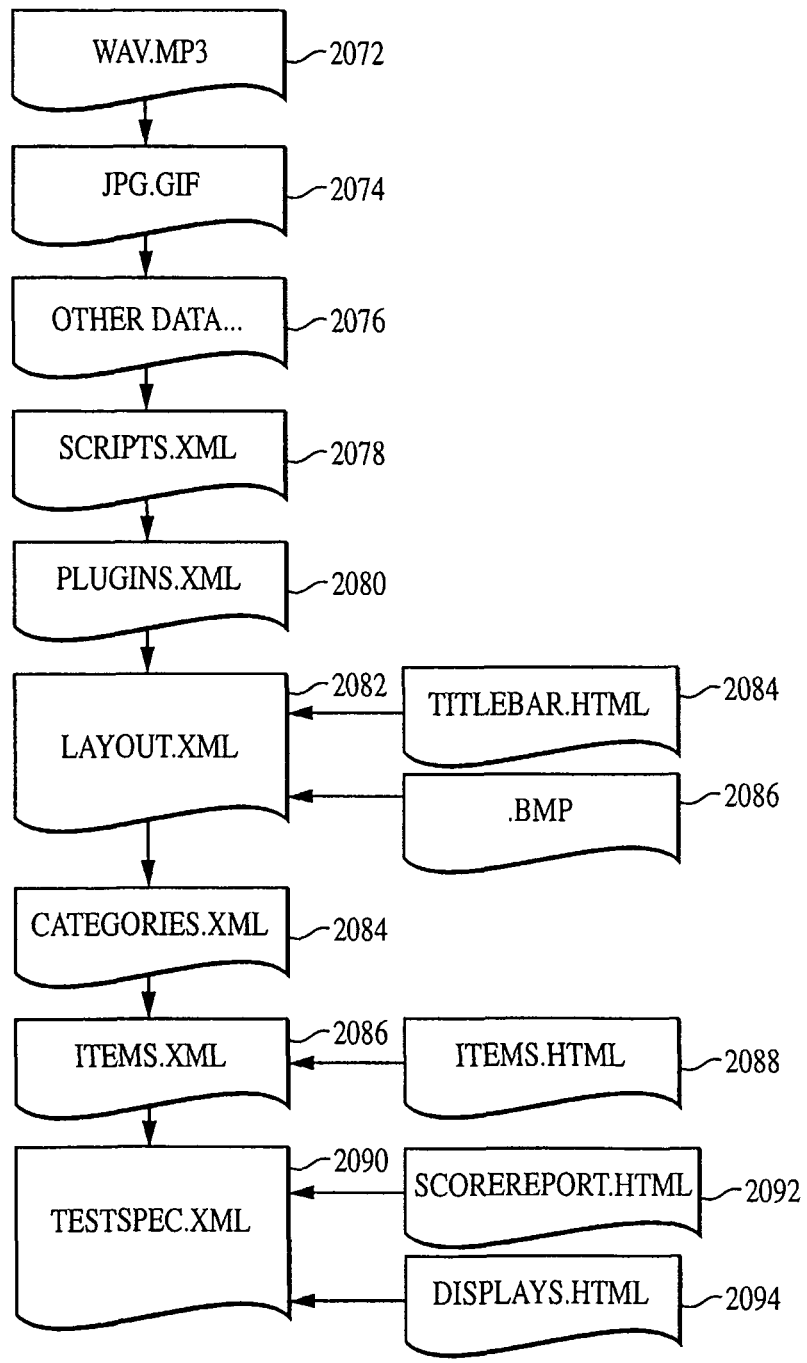
FIG. 6 is a flow diagram that illustrates a compile order for compiling a source file according to the present invention.

FIG. 6 illustrates a compile order for exam source file 130 in accordance with one embodiment. Other compile orders are possible so long as the basic functionality described herein is performed. Exam source files 130 include, for example, data files 132. Data files 132 include, for example, several multimedia files, e.g., sound files 2072 (.wav, .mp3, etc.) and image files 2070 (.jpg, .gif, etc.). Data files 132 are typically globally accessible to the test specification and content as defined in XXL files 134. Therefore, data files 132 are compiler first. It does not matter, however, in which order data files 132 are themselves compiled.

XXL files 134 preferably are compiled after data files 132, if data files 132 exist. Otherwise, XXL files 134 are compiled first. Other compilation orders may optionally be used. Any globally available scripts 2078 or other global data 2076 preferably are compiled first. Plugins 150 are compiled next. It should be noted that data files 2070, other data files 2076, and scripts 2078 are optional. Therefore, plugins 150 can be the first files to be compiled if the other files are not present in exam source file 130. Any files concerning the layout of the test, i.e., layout files 2082, are next in the compilation order. Titlebar.html file 2084 and .bmp file 2086 are examples of pulled files. Pulled files are typically files that are used to create the visual format of the test and are usually defined using HTML. (See HTML files 138 in FIG. 3.) If a file is reference in HTML then the file is compiled at the same time as the XXL file that is referencing the HTML file.

If the test uses categories, categories files 2084 are compiled next, since categories files 2084 can reference any global data files 132, plugins 150, and layout files 2082. Items files 2086, which include test questions that are to be delivered to the examinee, are compiled next and any HTML files referenced by items files 2086 are compiled along with items files 2086. Finally test specification files 2090, which are part of XXL files 134, are compiled. Test specification files 2090 define the groups, sections, forms, form groups, and exams that comprise the test. Various files, e.g., score report files 2092 and displays files 2094 can be referenced by test specification files 2090 and are compiled along with test specification files 2090.

Figure 7:
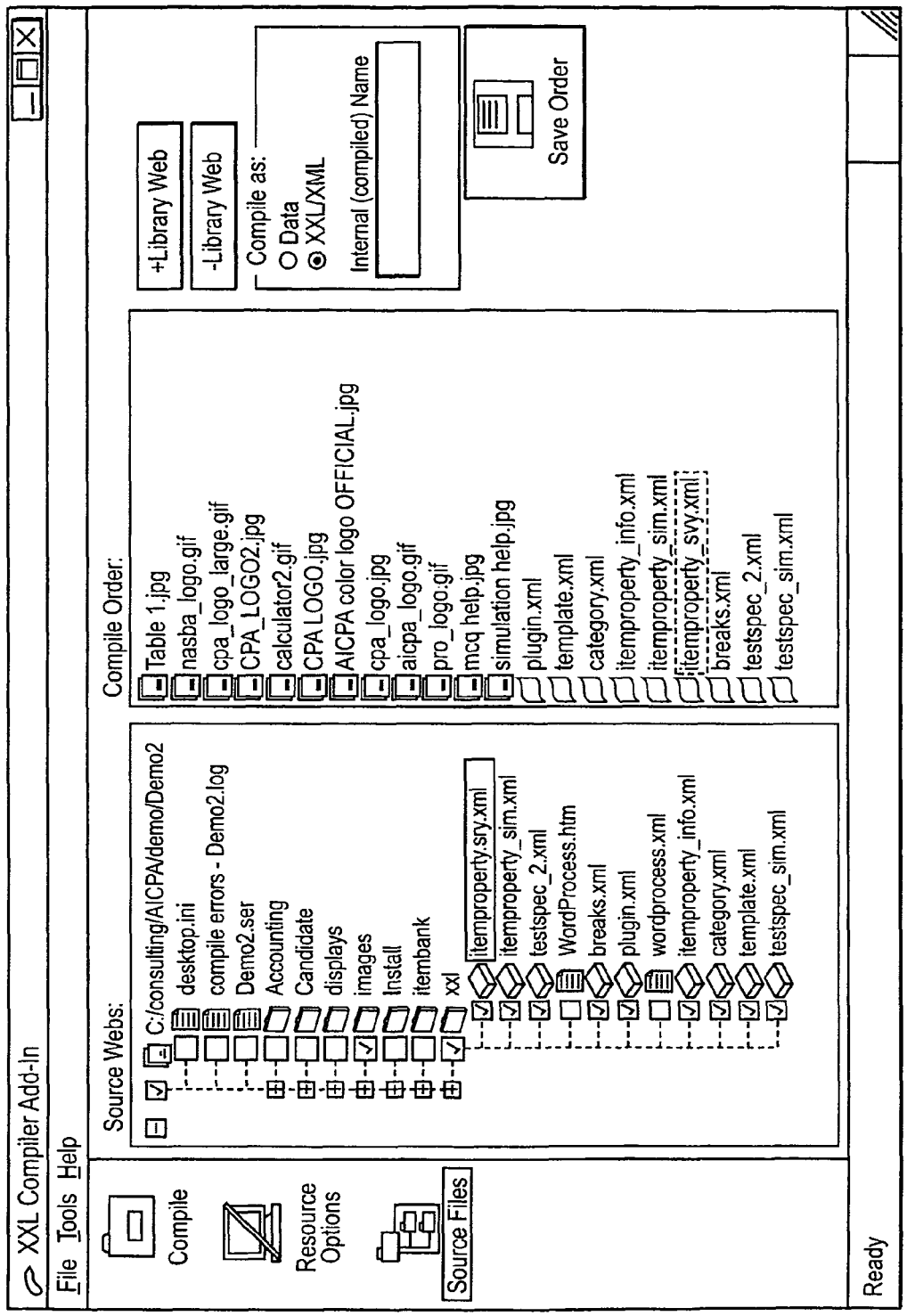
FIG. 7 illustrates how a test publisher defines the compile order.
Figure 8:
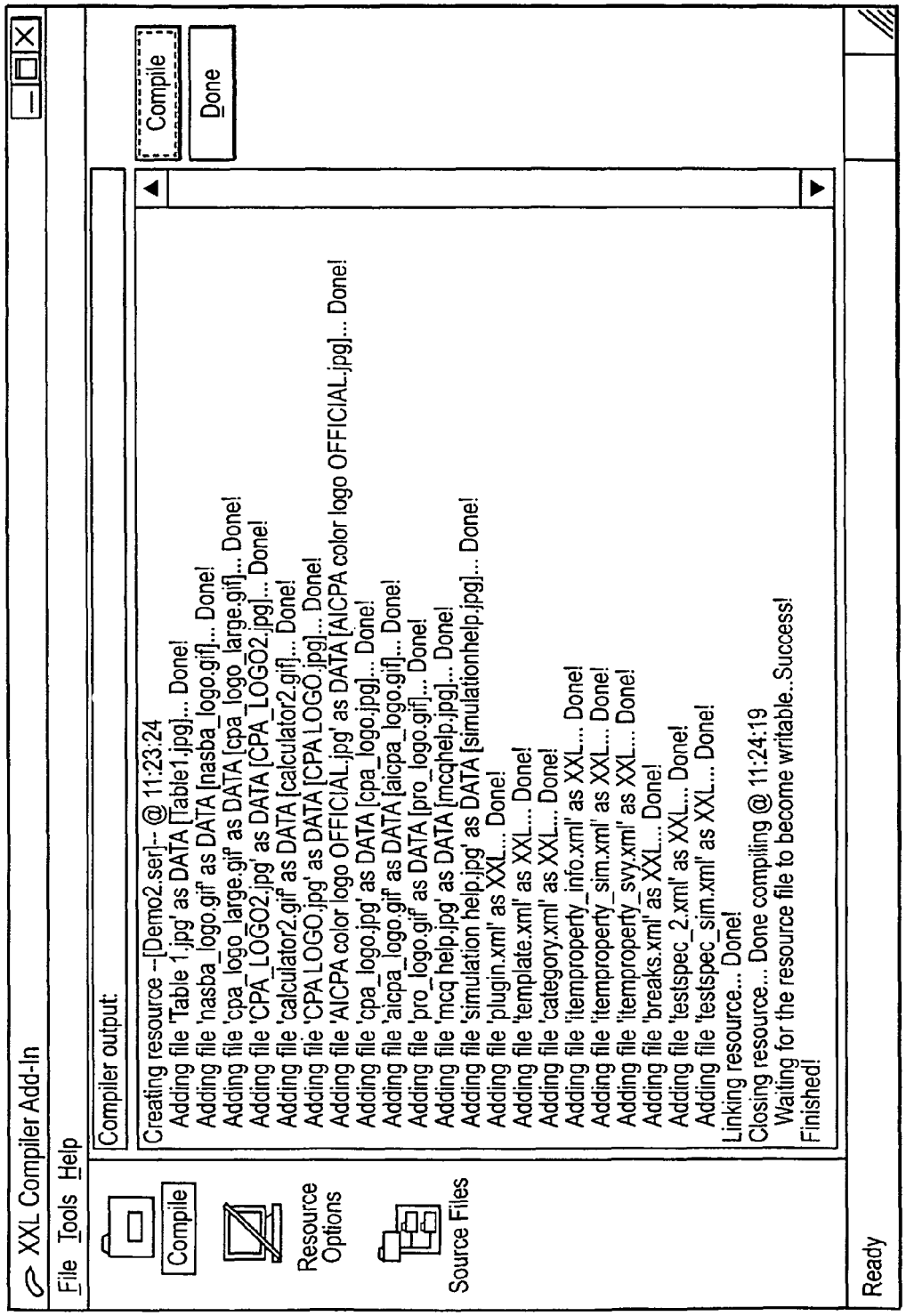
FIG. 8 illustrates an output of the test definition language compiler based on the compile order.

The test publisher defines the compile order before starting the first compile sequence. FIG. 7 illustrates how the test publisher defines the compile order. In source webs window 2092, the test publisher first compiles all .jpg and .gif image files. All XML files are compiled next. Plugin files 2080 are first in the sequence, followed by the template files, which are included in layout files 2082. Next category files 2081 are compiled, followed by three items files 2086. Finally, test specification files 2090 are compiled. FIG. 8 shows the output of the compilation process. The files are compiled in the order specified by the test publisher, as shown in FIG. 7. Other compile sequences may optionally by used that accomplish the functionality and/or objects of the present invention.

III. XXL Test Definition Language

A. Exam Resource File

Figure 9:
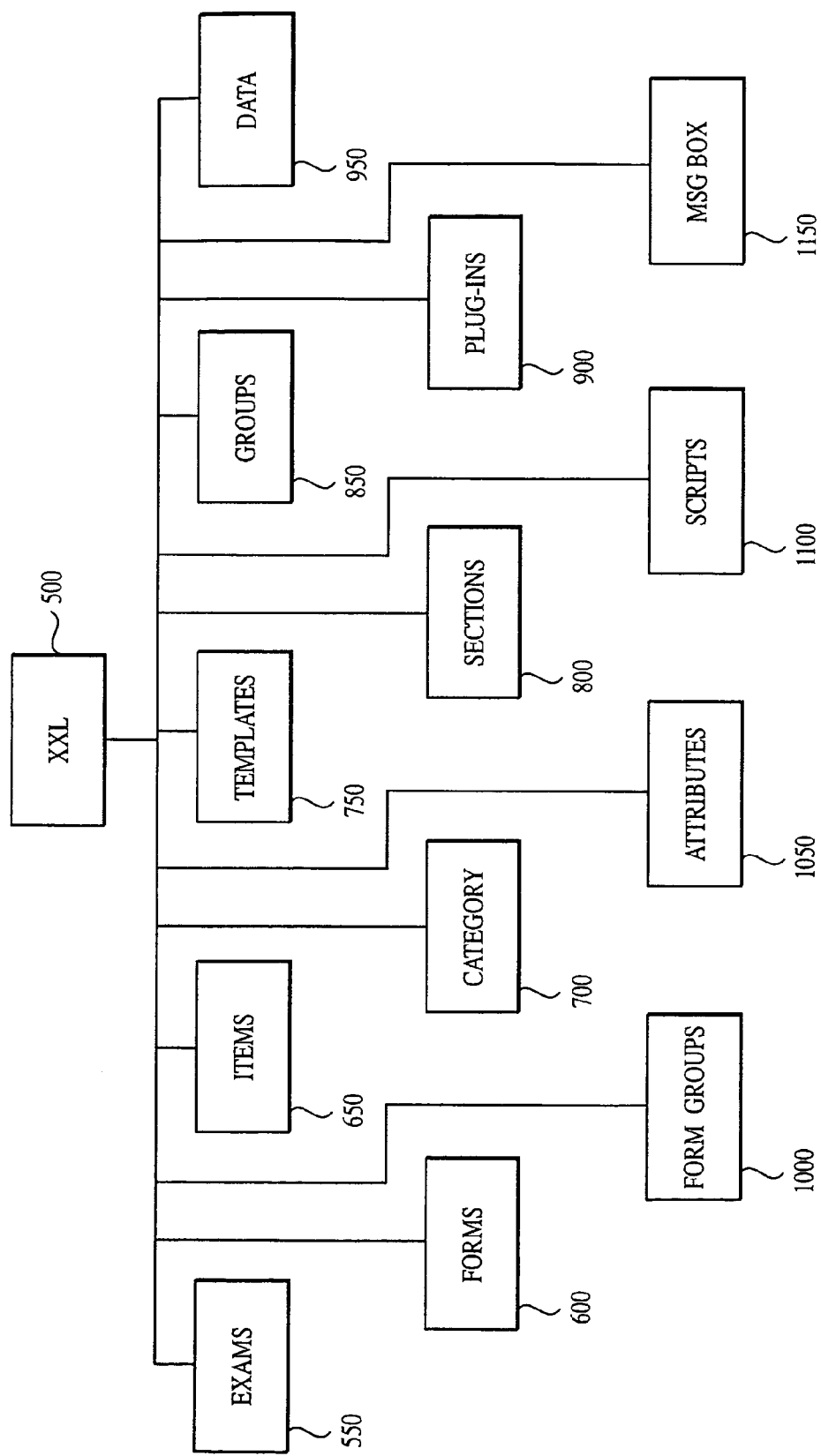
FIG. 9 is a block diagram of main storage branches of an exam resource file according to the present invention.

FIG. 9 illustrates the main storage branches of exam resource file 120, which corresponds to the top-level elements of the XXL test definition language, denoted by reference numeral 500. The main storage branches of exam resource file 120 are, for example: exams branch 550; forms branch 600; items branch 650; category branch 700; templates branch 750; sections branch 800; groups branch 850; plugins branch 900; data branch 950; formGroups branch 1000; attributes branch 1050; scripts branch 1100; and message box ("Msgbox") branch 1150. Other storage branches may alternatively be used.

Figure 10:
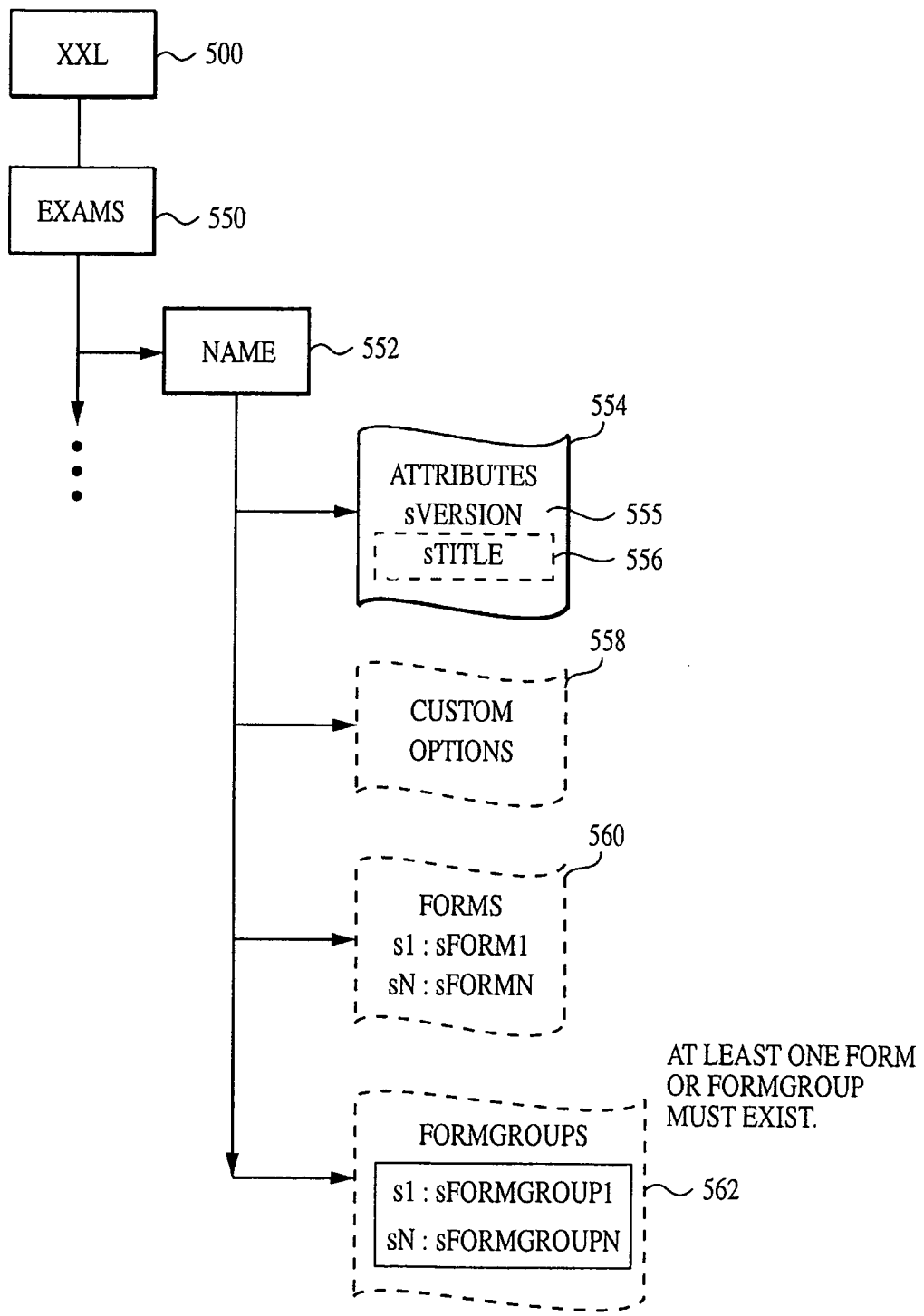
FIG. 10 is a block diagram illustrating an exams branch of the exam resource file.

Exam branch 550, as seen in FIG. 10, stores, for example, the primary attributes, properties, and data that govern the test. Exam branch 550 can store information for various tests, as is denoted by the three, vertical ellipses. A specific test is identified by the data stored in name attribute storage 552 or other identification schemes. Again, the various tests may each be identified by a different name, as denoted by the solid border around name attribute storage 552. Attributes storage 554 stores version information 555, and title information 556 of the test as a stream of data or other data storage format. Title information 556 is optional, as is denoted by the broken border. Any optional, customized information regarding the test is stored in custom properties 558 as a property storage or other data storage format. Information relating to the forms of the test are optionally stored in forms property storage 560. A form is a fixed or substantially fixed order of testing events. Many different forms can be stored in forms storage 560, giving flexibility to test driver 110 in controlling progression of the test. FormGroups storage 562 optionally stores information relating to a collection of exam forms as a stream of data. Preferably, a single form from the formGroup is chosen to deliver to an examinee. The selection of the form from the group is performed by a selection plugin 160. Exam branch 550 preferably contains at least one forms storage 560 either independently or within formGroups storage 562. Other information relating to the test may be stored under exam branch 550.

Figure 11A:
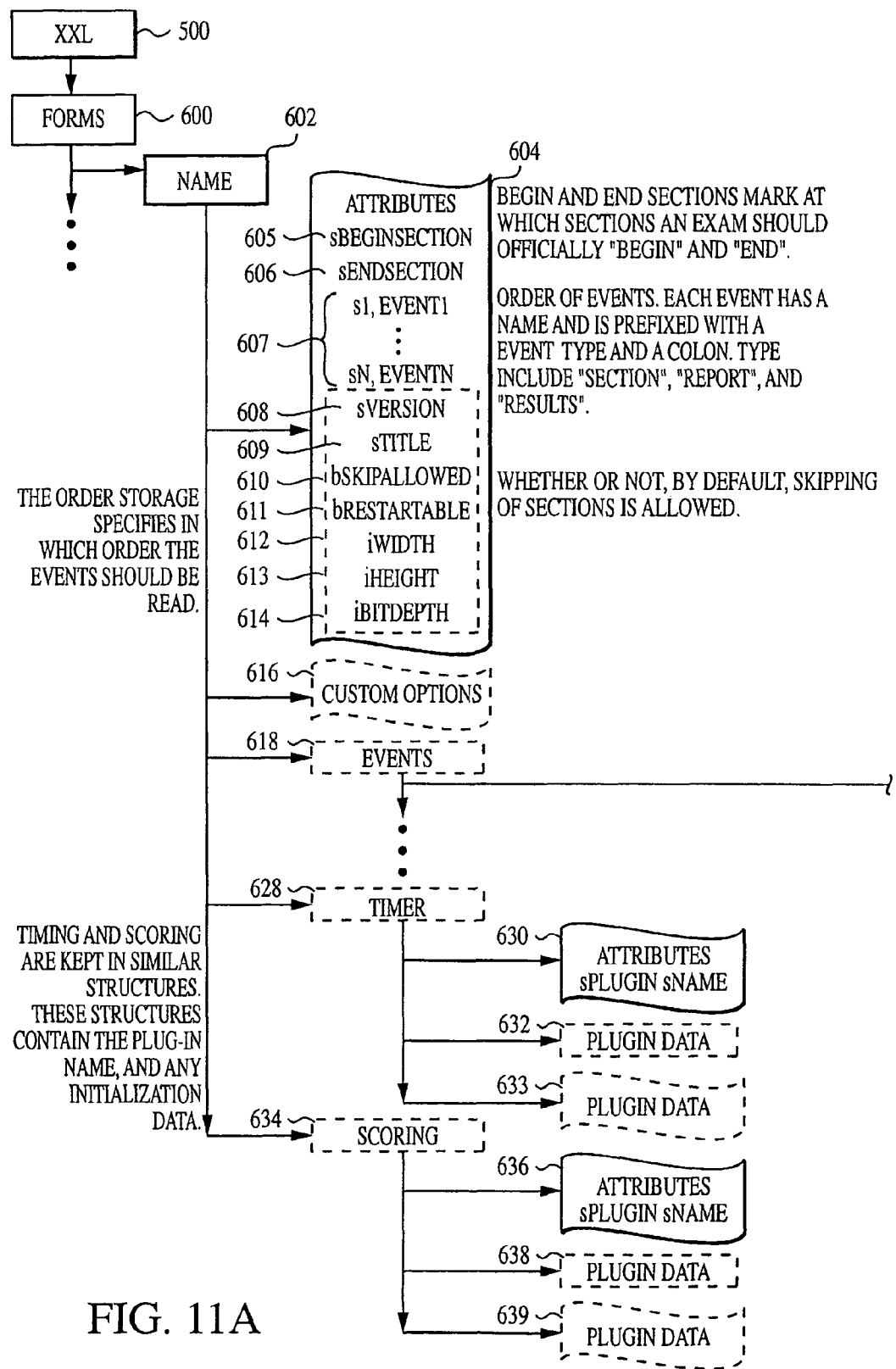
FIGS. 11A and 11B are block diagrams illustrating a forms branch of the exam resource file.
Figure 11B:
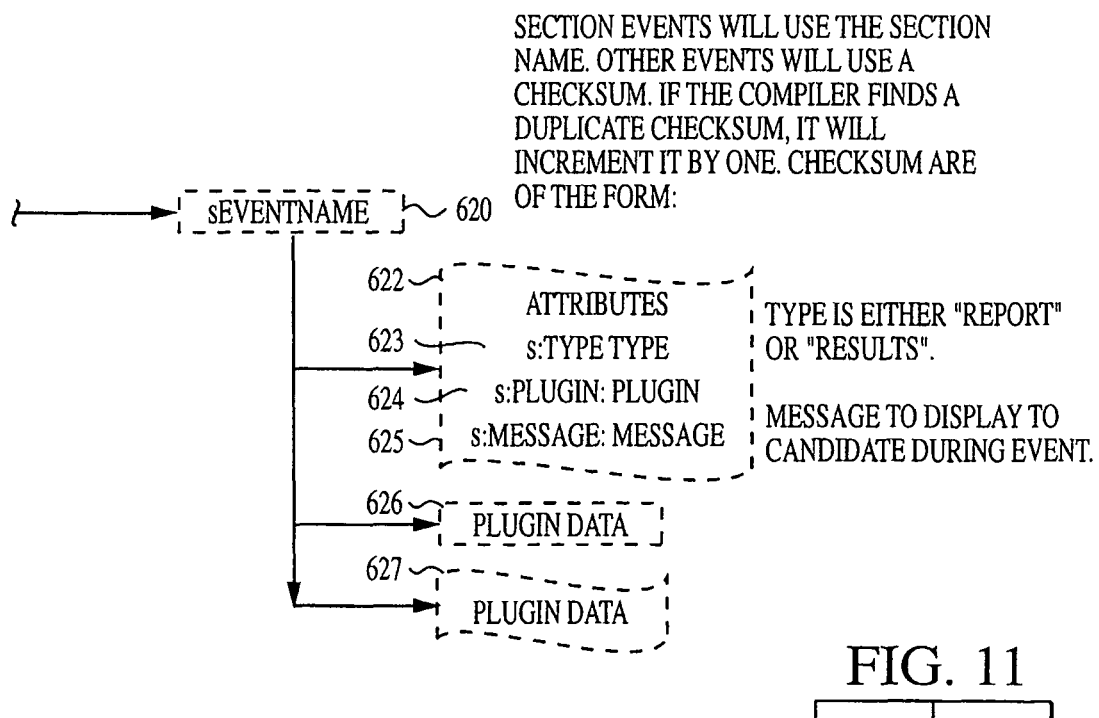
Figure 11:
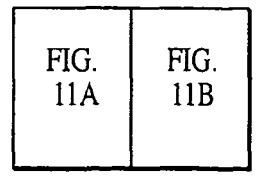

Forms branch 600, as seen in FIGS. 11A and 11B, stores, for example, the primary attributes, properties, and data that govern the progress of the test. Forms branch 600 can store information for various forms, as is denoted by the three, vertical ellipses. As described previously, a form is a fixed or substantially fixed order or substantially fixed of testing events. A single form is identified by the data stored in name attribute storage 602. Other identification formats may optionally be used. Again, the various forms may each be identified, for example, by a different name, as denoted by the solid border around name attribute storage 602. Attribute storage 604 stores, for example, begin section information 605, end section information 606, event information 607, and optionally stores version information 608, title information 609, skip allowed information 610, restartable information 611, with information 612, height information 613, and bit depth information 614. All information stored in attribute storage 604 is stored as a stream of data or other storage format. Begin section information 605 and end section information 606 indicates respectively which section of the test begins and ends the test.

Event information 607 indicates, for example, the order of events of the test for that form. Each event has a name and is prefixed with an event type and a colon. Other formats are optional. The event type includes "section", "report", and "results". Version information 608 and title information 609 indicate the version and title of the form, respectively. Skip allowed information 610 indicates whether or not by default skipping of sections is allowed. Restartable information 611 indicates whether the form can be restarted. Any optional, customized information regarding the form is stored in custom storage 616 as a property set or other data storage format. Timer storage 628 stores, for example, information relating to how the form is to be timed as a storage element. Attributes storage 630 stores, for example, the names of Timer Plugin 158 to be used with the form. Plugin data storage 632 and plugin data storage 633 store any data necessary for timer plugin 158 as a storage element and a stream of data, respectively. Plugin data storage 632 and plug in data storage 633 are optional. Scoring storage 634 stores, for example, information relating to the scoring of the form. Attributes storage 636 stores, for example, the name of scoring plugin 164 to be used with the form. Plugin data 638 and plugin data 639 optionally store any data needed for scoring Plugin 164 as a storage element and a stream of data respectively.

Figure 12:
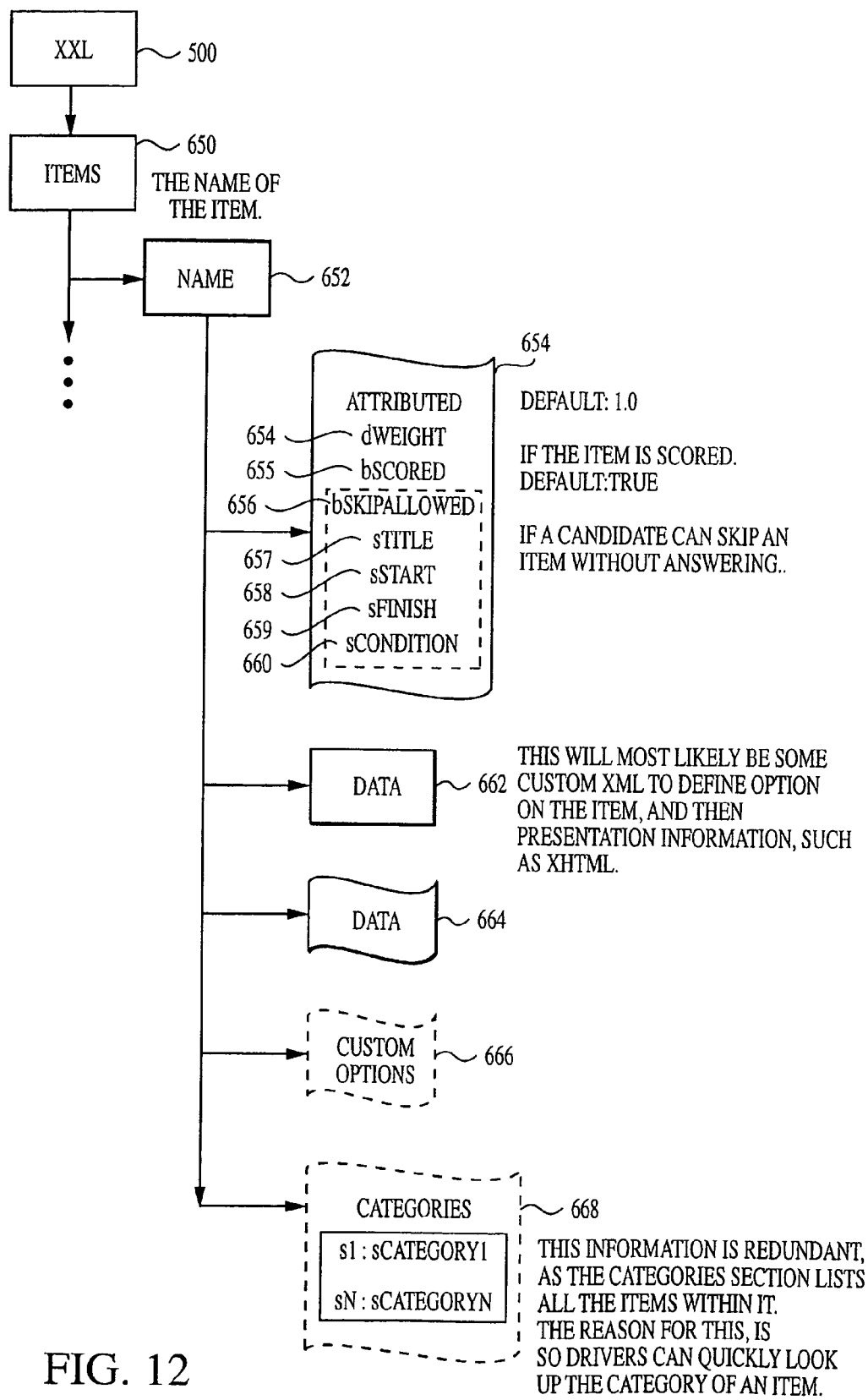
FIG. 12 is a block diagram illustrating an items branch of the exam resource file.

Items Branch 650, as seen in FIG. 12, stores, for example, the primary attributes, properties, and data that govern the items, or test questions, to be delivered to the examinee during the test. Items branch 650 can store information for various items, as is denoted by the three, vertical ellipses. A single item is identified by the data stored in name attributes storage 652. Again, the various items may each be identified by a different name, as denoted by the solid border around name attributes storage 652. Attributes storage 654 stores, for example, weight information 654, scored information 655, and optionally stores, for example, skip allowed information 656, title information 657, start information 658, finish information 659, and condition information 660. Weight information 654 indicates a value used for judging and scoring the item. By default an item is given a weight of one in accordance with one embodiment, but other values may be utilized. Scored information 655 indicates whether or not the item is scored as opposed to whether the item is being used as an example. The default of scored information 655 is true. Skip allowed information 656 indicates whether the examinee can skip the item without answering. Start information 658 indicates script execution at the beginning of the item and finish information 659 indicates script execution at the end of the item. Condition information 660 indicates whether or not there is a condition on the item being delivered to the examinee. The information stored in attributes storage 654 is stored as a stream of data or other data storage format. Data storage 662 and data stream 664 store any information regarding the properties of the item. For example, data storage 662 or data stream 664 can store the correct answer of a multiple choice item. Data storage 662 and data stream 664 stored the information as a storage element and a stream of data respectively. Any optional, customized information regarding the item is stored in customs storage 666 as a stream of data or other data storage format. Category storage 668 stores, for example, information relating to each category to which the item belongs. The information stored in category storage 668 preferably and optionally is redundant, as category branch 700 stores, for example, all the items within the specific categories. The reason for the optionally redundancy is so that test driver 110 can quickly look up the category of any item.

Figure 13:
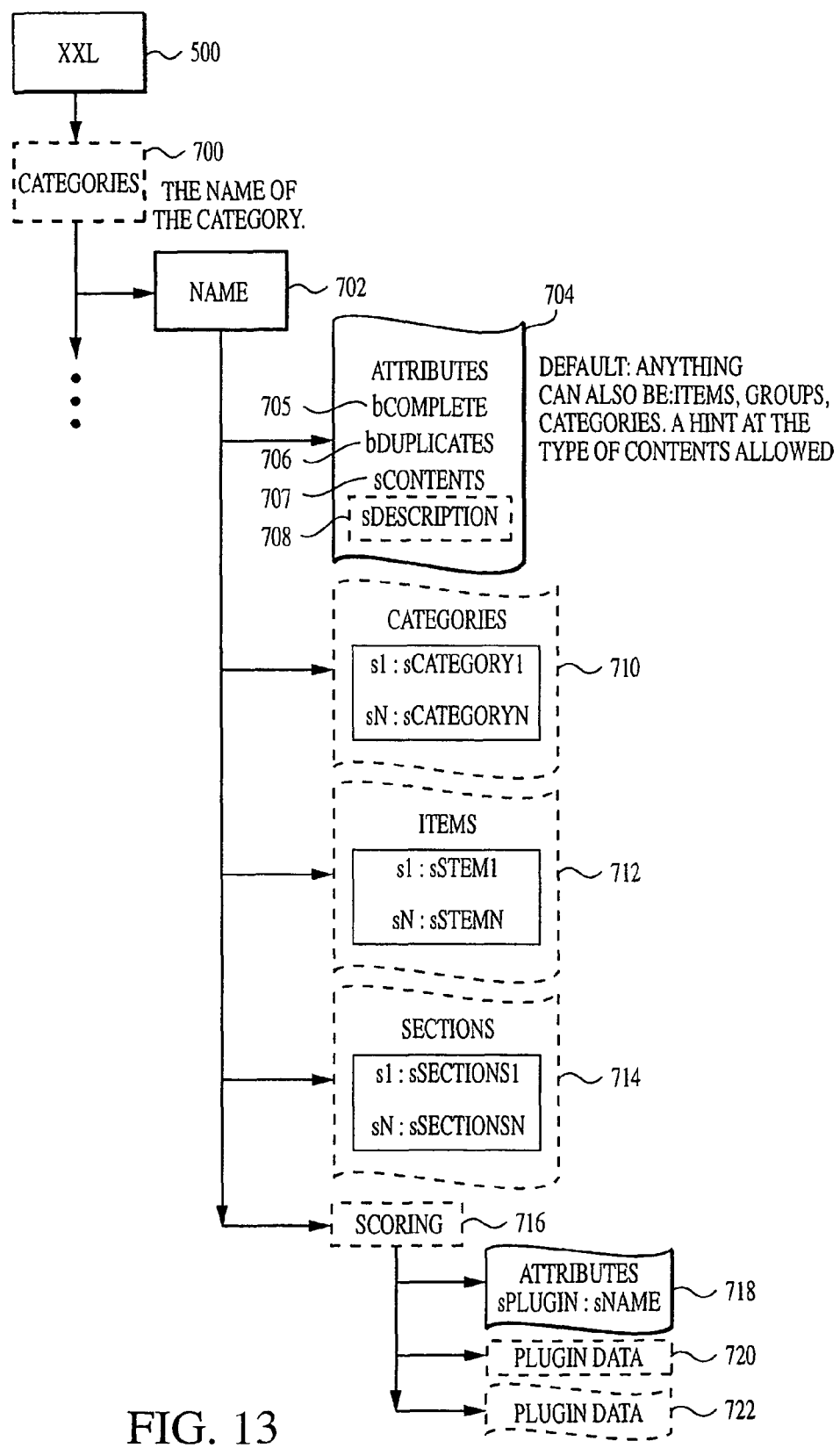
FIG. 13 is a block diagram illustrating a categories branch of the exam resource file.

Category branch 700, as seen in FIG. 13, stores, for example, the primary attributes, properties, and data that govern the test categories. A test category provides a grouping mechanism, which is independent of delivery of the test, allowing for exotic reporting and scoring if necessary. For example, the test delivers 50 questions of fire safety from a pool of 200 questions. The 50 questions are chosen at random. All 50 questions are delivered together to the examinee in one section. Each question is a member of one of three categories: fire prevention, flammable liquids and fire retardants. The test sponsor wants the report and results to show how well the examinee did in each category. Hence the results are grouped exotically by the category, rather than by the order delivered.

Category branch 700 is optional as denoted by the broken border. Category branch 700 can store information for various categories, as is denoted by the three, vertical ellipses. A single category is identified by the data stored in name attributes storage 702. Again, the various categories may each be identified by a different name, as denoted by the solid border around name attributes storage 702. Attributes storage 704 stores, for example, complete information 705, duplicates information 706, contents information 707, and optionally stores description information 708. Complete information 705 indicates whether or not every item in the category must appear within the category or within its subcategories. Duplicates information 706 indicates whether the item can appear more than once within the category or within the subcategories. Contents information 707 determines what can exist within a category. Description information 708 is used within the category to contain a description of the category's contents. Category storage 710 stores, for example, information relating to any subcategories under the category identified in name attribute storage 702. Items storage 712 indicates any items that exist within the category. Sections storage 714 contains information indicating what any sections that exist within the category. Scoring storage 716 contains information relating to the scoring of the items within the category. Attributes storage 718 stores, for example, the name of the scoring plugin to be used with the item. Data storage 720 and data stream 722 contain the information needed to initialize scoring plugin 164. Data storage 720 and data stream 722 store the information as a storage element and a stream of data respectively.

Figure 14:
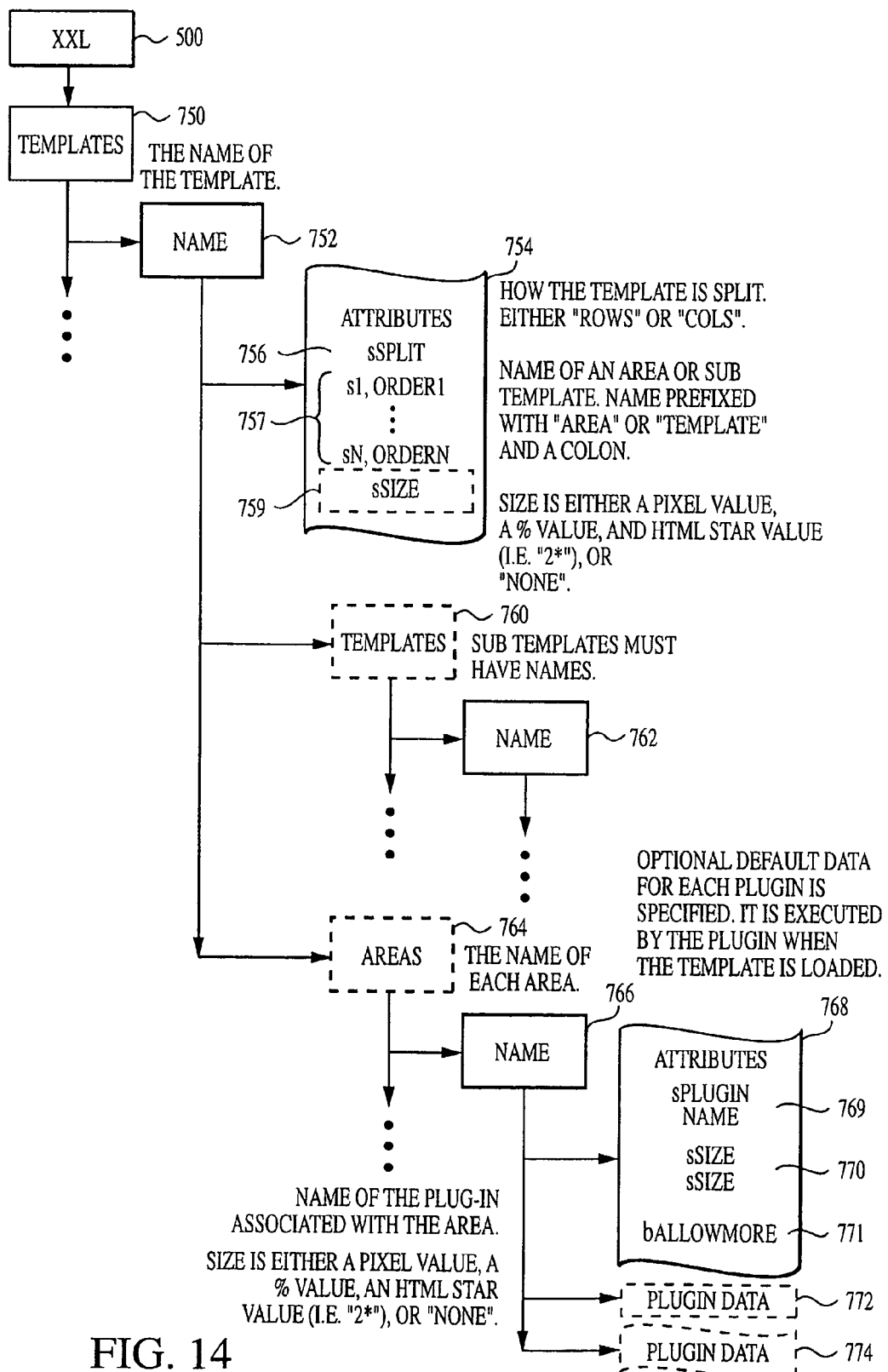
FIG. 14 is a block diagram illustrating a templates branch of the exam resource file.

Templates branch 750, as seen in FIG. 14, stores, for example, the primary attributes, properties, and data that govern the templates used in the test. Template branch 750 can store information for various main templates, as is denoted by the three, vertical ellipses. A single main template is identified by the data stored in name attributes storage 752. Again, the various templates may each be identified by a different name, as denoted by the solid border around name attributes storage 752. Attributes storage 754 stores, for example, split information 756, order information 757, and optionally stores size information 759. Split information 656 defines how a specific area within the template is to be split or separated, for example, either by rows or columns or other shapes and/or sizes. Size information 759 indicates possible values for describing the size of the template, for example, pixels, percentages, or html syntax. Template storage 760 stores, for example, information relating to any sub-templates to be used under the templates specified by the information in name attributes storage 752. Sub-templates are identified by the information in name attributes storage 762. Many sub-templates 760 can exist as denoted by the three vertical ellipses.

Areas storage 764 indicates, for example, information relating to the areas used within the template denoted by the information in name attributes storage 752. Many areas may exist within a template as denoted by the three vertical ellipses. Each area is identified by the information stored in name attribute storage 766. Attribute storage 768 stores, for example, visible plugin name information 760, size information 770, and allow more information 771. Plugin name information 760 indicates the name of the visible plugin to be used with the area. Size information 770 indicates the size of the area, as for example a pixel value, a percentage value, or HTML syntax. Plugin data 772 and plugin data 774 store information relating to the visible plugin to be used in the area. The data stored in either plugin data storage 772 or plugin data stream 774 is executed by the visible plugin when the template is loaded. Plugin data storage 772 and plugin data stream 774 stores, for example, the information as either a storage element or a stream of data, respectively. Other information may optionally be stored.

Figure 15:
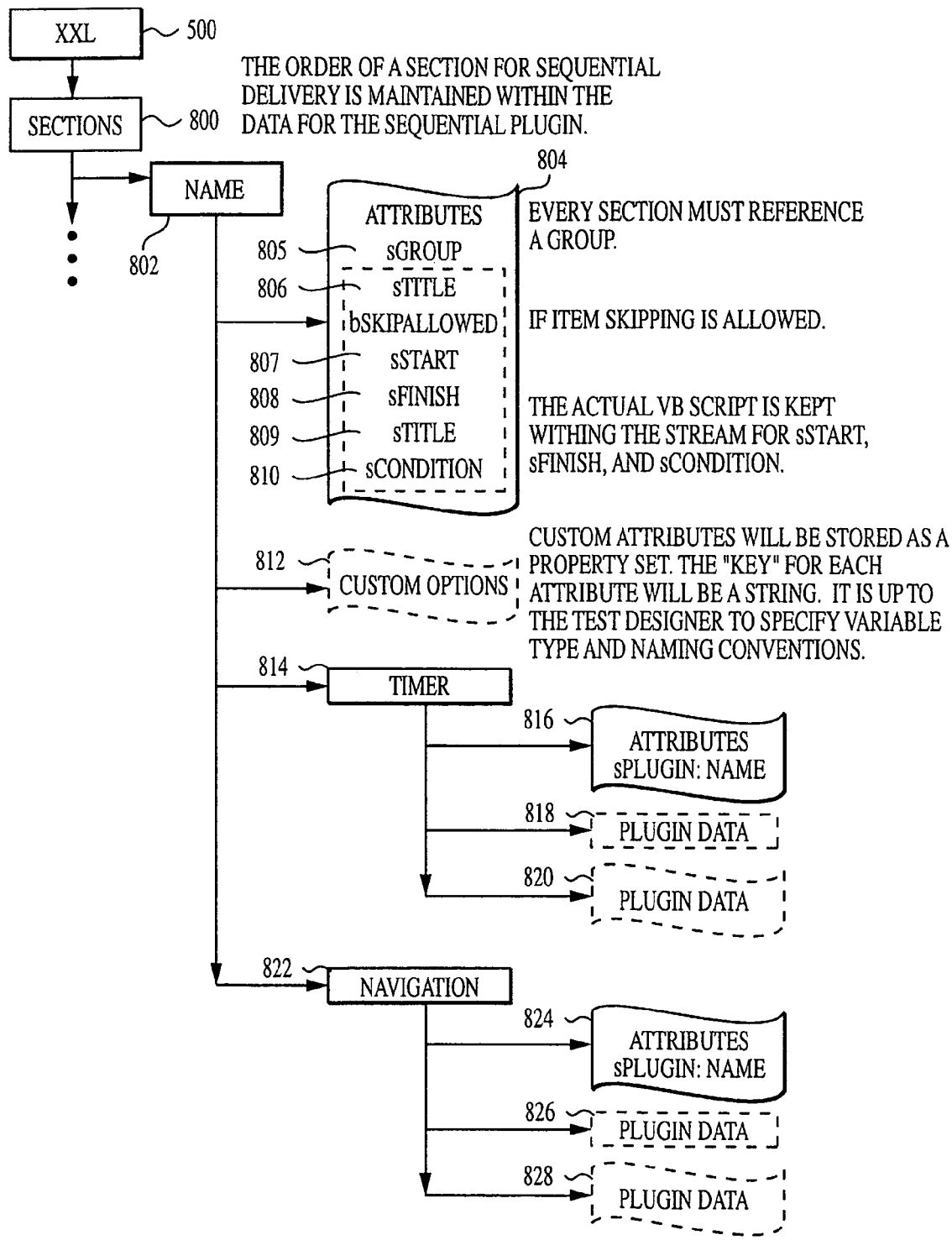
FIG. 15 is a block diagram illustrating a sections branch of the exam resource file.

Section branch 800, as seen in FIG. 15, stores, for example, the primary attributes, properties, and data that govern test sections. Test sections dictate the navigation and timing of groups of items as well as displays within the test. Sections branch 800 can store information for various sections, as is denoted by the three, vertical ellipses. A single section is identified by the data stored in name attribute storage 802. Again, the various sections may each be identified by a different name, as noted by the solid border around name attributes storage 802. Attributes storage 804 stores, for example, group information 805 and optionally stores, for example, title information 806, skip allowed information 807, start information 808, finish information 809, and condition information 810. Group information 805 indicates to which group of the test the section belongs. Skip allowed information 807 indicates whether or not the items within the section may be skipped. Start information 808 indicates script execution at the beginning of the section and finish information 809 indicates script execution at the end of the section. Condition information 810 indicates any conditions that exist regarding the section. Any optional, customized information regarding this section is stored in custom property storage 812 as a stream of data or other data storage format. Custom attributes will be stored as a property set. The "key" for each attribute will be a string or other acceptable format.

Figure 16:
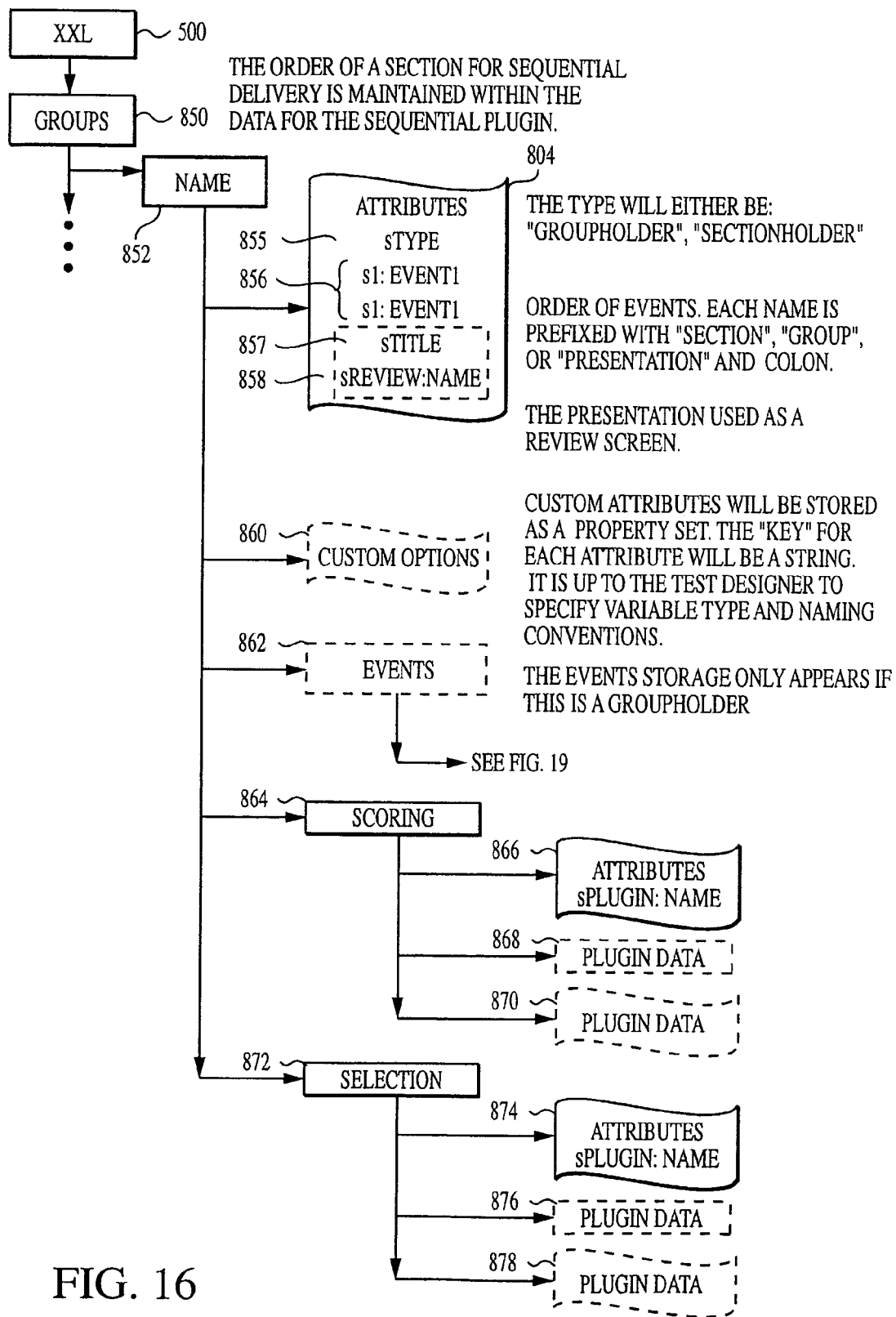
FIG. 16 is a block diagram illustrating a groups branch of the exam resource file.

Timer storage 814 stores, for example, information regarding, for example, the timing of the section. Attribute storage 816 stores, for example, information identifying timer plugin 158, which is to be used with a section. Plugin data storage 818 and plugin data storage 820 stores, for example, data needed for timer plugin 158. Plugin data storage 818 and plugin data storage 820 stores, for example, information as a storage element and a string of data or other acceptable format, respectively. Navigation storage 822 stores, for example, information relating to the delivery of presentations and groups within the section. Attributes storage 824 stores, for example, information indicating which navigation plugin 162 is to be used with this section. Plugin data storage 826 and plugin data stream 828 store information needed for the navigation plugin 162. Plugin data storage 826 and plugin data stream 828 store the information as a storage element and a stream of data respectively. Groups branch 850, as seen in FIG. 16, stores, for example, the primary attributes, properties, and data that govern the groups within the test. A group determines the order of events within the test. Groups branch 850 can store information for various groups, as is denoted by the three, vertical ellipses. A single group is identified by the data store in name attributes storage 852. The various groups may each be identified by a different name, as noted by the solid border around name attributes storage 852. Attributes storage 854 stores, for example, type information 855, event information 856, title information 857, and reviewed name information 858. Type information 855 indicates whether the group is either a "group holder" (group of presentations), or a "section holder" (group of sub-sections). These are mutually exclusive.

Event information 856 indicates, for example, the order of events within the test. Review name information 858 indicates whether or not a presentation within the group is to be used as a review screen. Any optional, customized information regarding the group is stored in custom storage 860 as a stream of data or other data storage format. Events storage 862 stores, for example, event information, for example, as is described in further detail in FIG. 17. Scoring storage 864 stores, for example, information relating to the scoring of items within the group. Attributes storage 866 stores, for example, information indicating which scoring plugin 164 is to be used with the group. Selection storage 872 stores, for example, information relating to the selection of items within the group. Attributes storage 874 indicates which selection plugin 160 is to be used with the group.

Figure 17A:
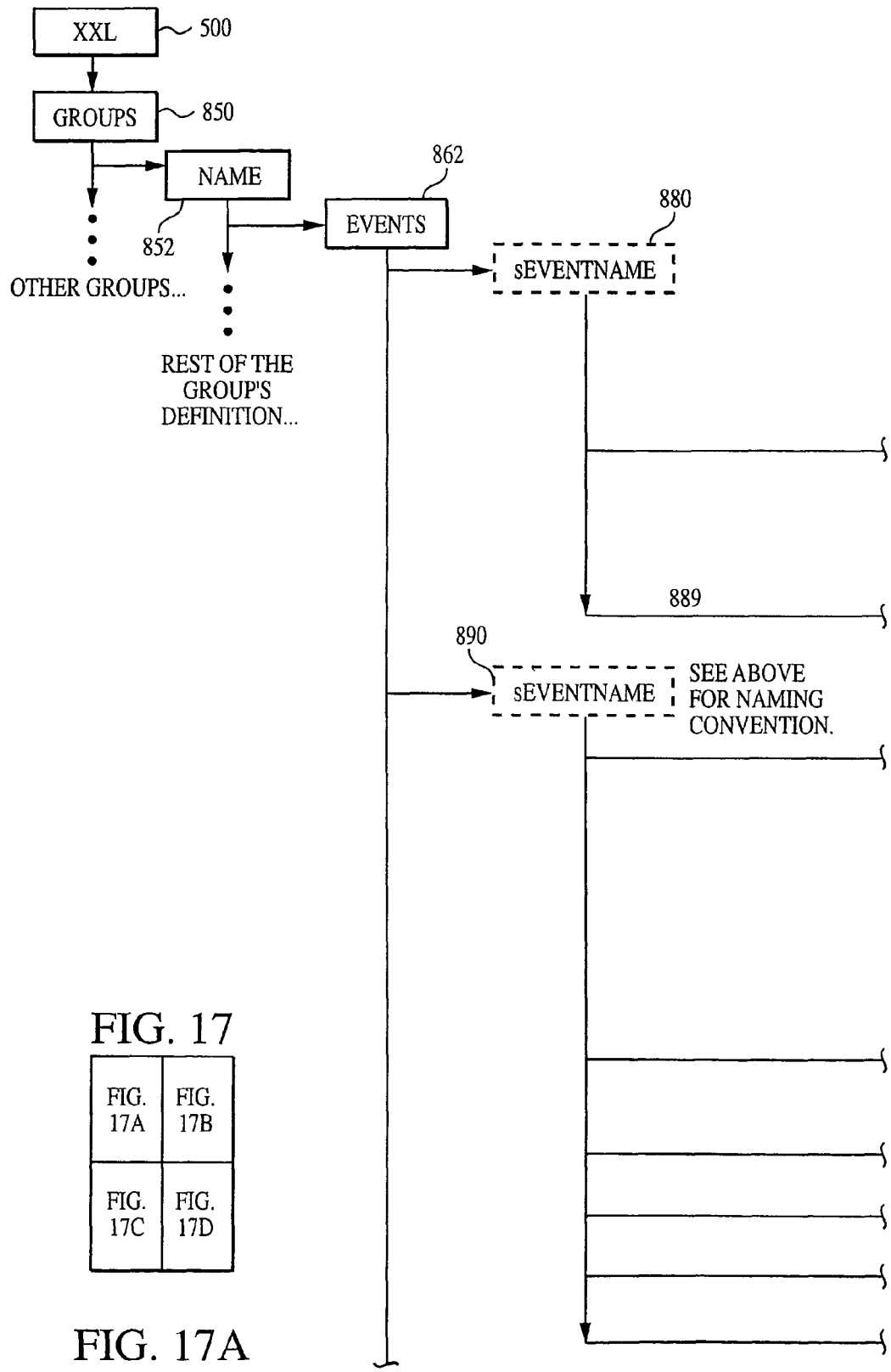
Figure 17C:
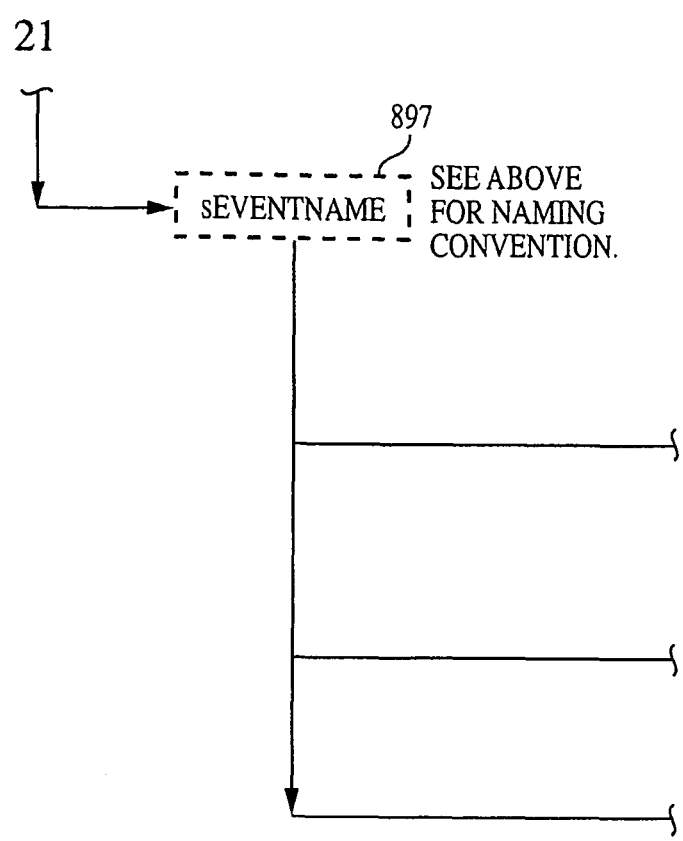
Figure 17D:
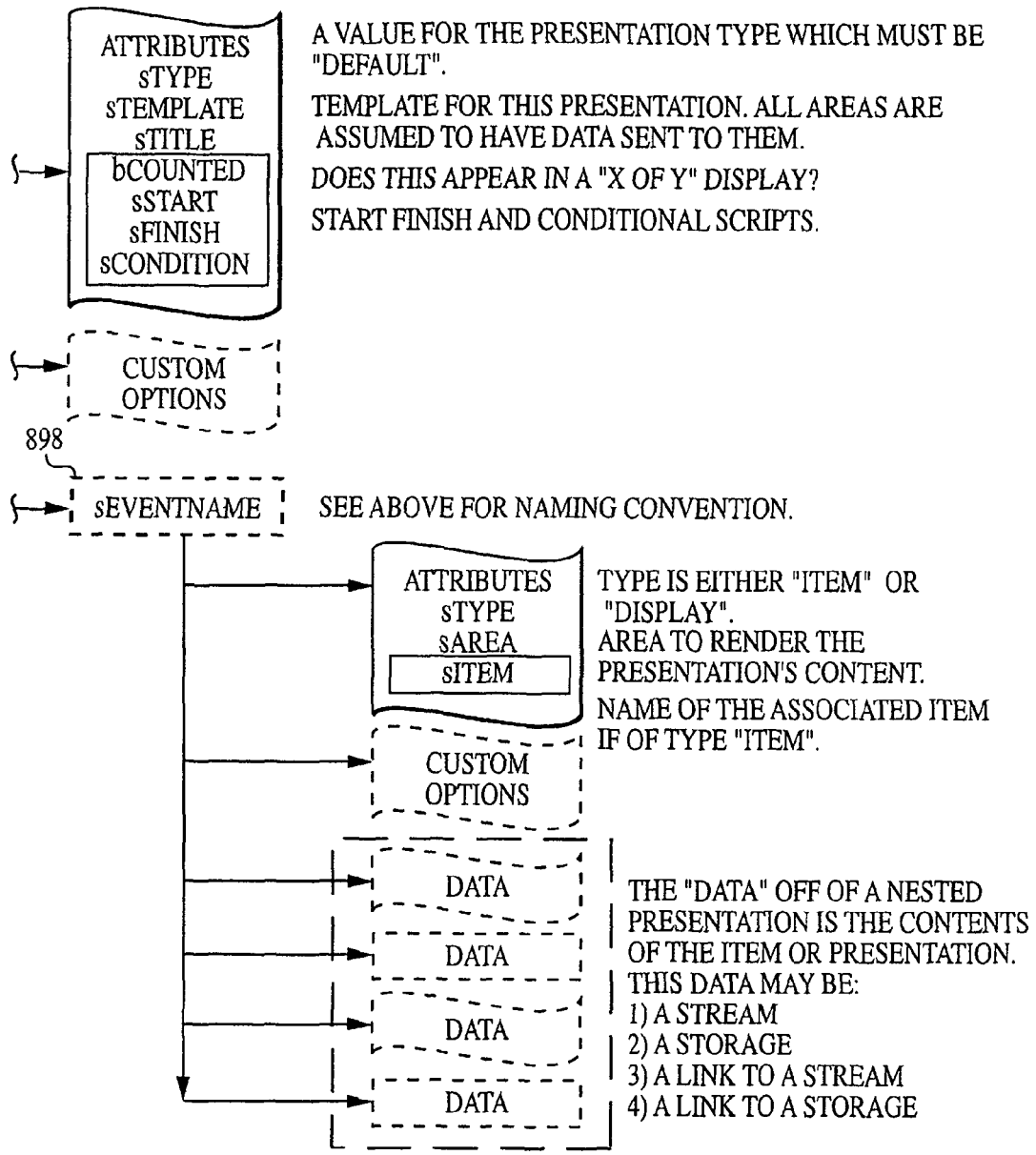

FIGS. 17A, 17B, 17C, and 17D illustrate the events sub-branch of groups branch 850 in greater detail in accordance with one embodiment of the invention. In FIG. 17A, events sub-branch 862 can store information for various events. For example, events sub-branch 862 is storing information in events name sub-branch 880, event name sub-branch 890, and event name sub-branch 897. Attributes storage 881, in FIG. 17B, under events name storage 880 stores, for example, type information 882, template information 883, and optionally stores, for example, title information 884, counted information 885, start information 886, finish information 887, and condition information 888. Type information 882 indicates whether the event is an item or a display. Template information 883 indicates which template is being used with the event. Counted information 885 indicates whether a presentation should be included in the totals of presentations presented to the examinee in a section. Generally, presentations with items, or questions, are counted and introductory presentations are not counted.

Start information 886, finish information 887, and condition information 888 indicates start, finish, and conditional scripts respectively. Any optional, customized information regarding the event is stored in custom storage 889. The "key" for each custom attribute will be a string. Referring again to FIG. 17A, event name storage 890 indicates, for example, a different event, which contains different attributes. Additionally, area information 891, in FIG. 17B, indicates, for example, which area is rendering the presentations content and item information 892 indicates the name of the associated item if the event is of the item type. Additionally, data storage 893, data stream 894, data storage 895, and data storage 896 contain information used in a nested presentation. The data off of a nested presentation are the contents of the item or the presentation. This data may be a stream, a storage, a link to a stream, a link to a storage, or other format. In FIG. 17C, event name 897 indicates another event, which includes a sub-event 898, in FIG. 17D.

Figure 18:
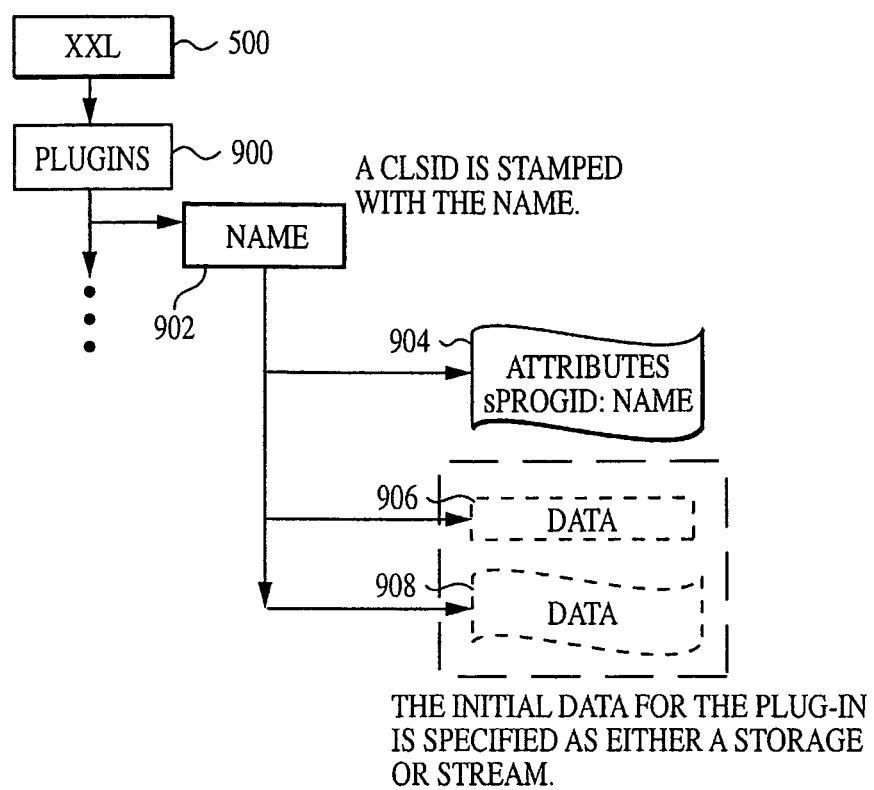
FIG. 18 is a block diagram illustrating a plugins branch of the exam resource file.

Plugins branch 900, as seen in FIG. 18, stores, for example, the primary attributes, properties, and data that govern any plugins 150 used for the test. Plugins branch 900 can store information for various plugins, as is denoted by the three, vertical ellipses. A single plugin is identified by the data stored in name attribute storage 902. A CLSID is stamped with the name of the plugin 150. Attributes storage 904 stores, for example, information identifying the plugin 150 by a program ID. Data storage 906 stores, for example, the data, for example, as either a stream, set of data, or as a storage element if plugin 150, respectively.

Figure 19:
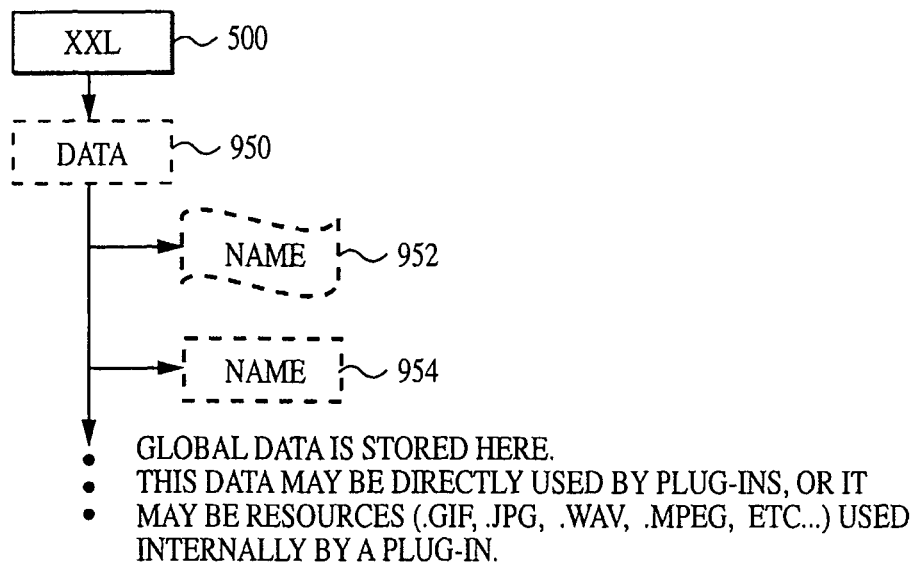
FIG. 19 is a block diagram illustrating a data branch of the exam resource file.

Data branch 950, as indicated in FIG. 19, stores, for example, any global data needed for the test. Data stored optionally under data branch 950 may be stored as either a storage element or a stream of data as indicated by data storage 952 and data storage 954. Data stored under data branch 950 may be directly used by a plugin 150 or the data may be resources (.gif, .jpeg, .wab, .mpeg, etc.) used internally by a plugin 150.

Figure 20:
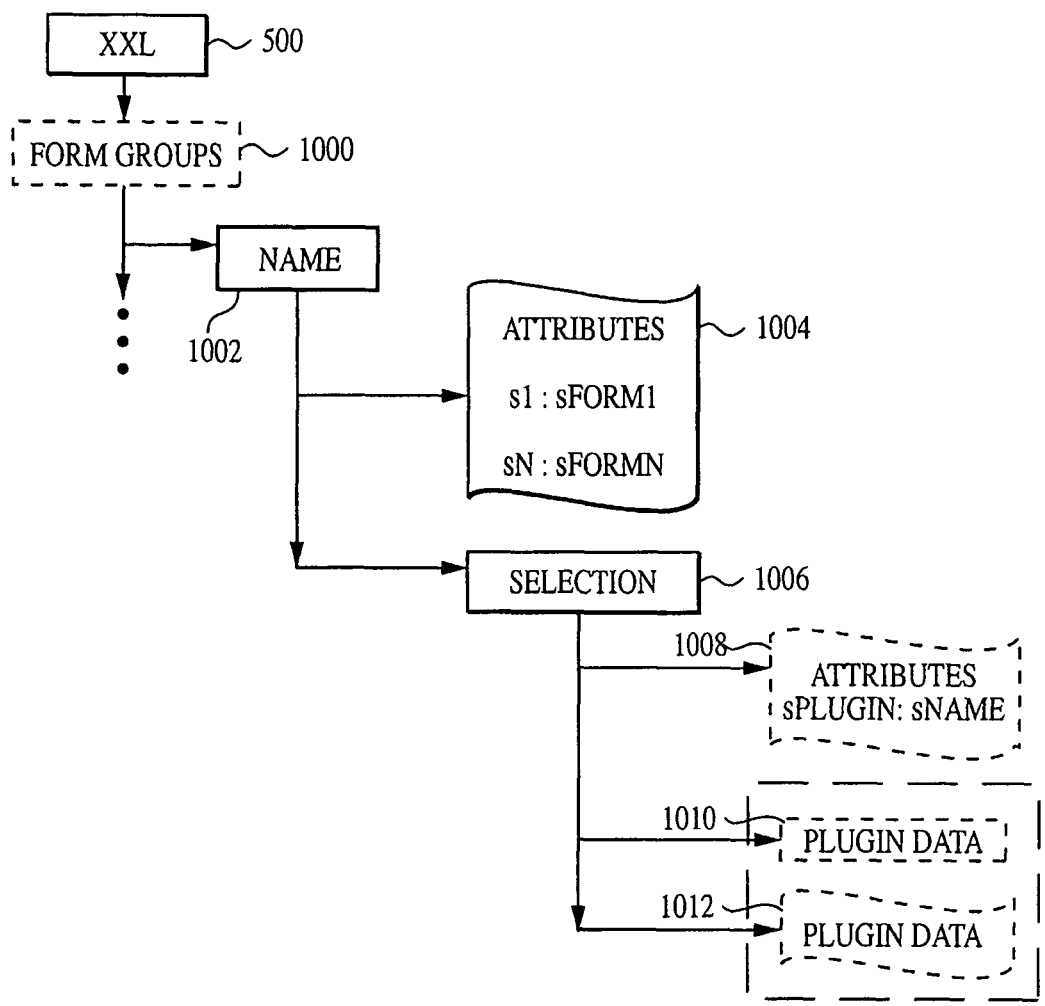
FIG. 20 is a block diagram illustrating a formGroups branch of the exam resource file.
Figure 21:
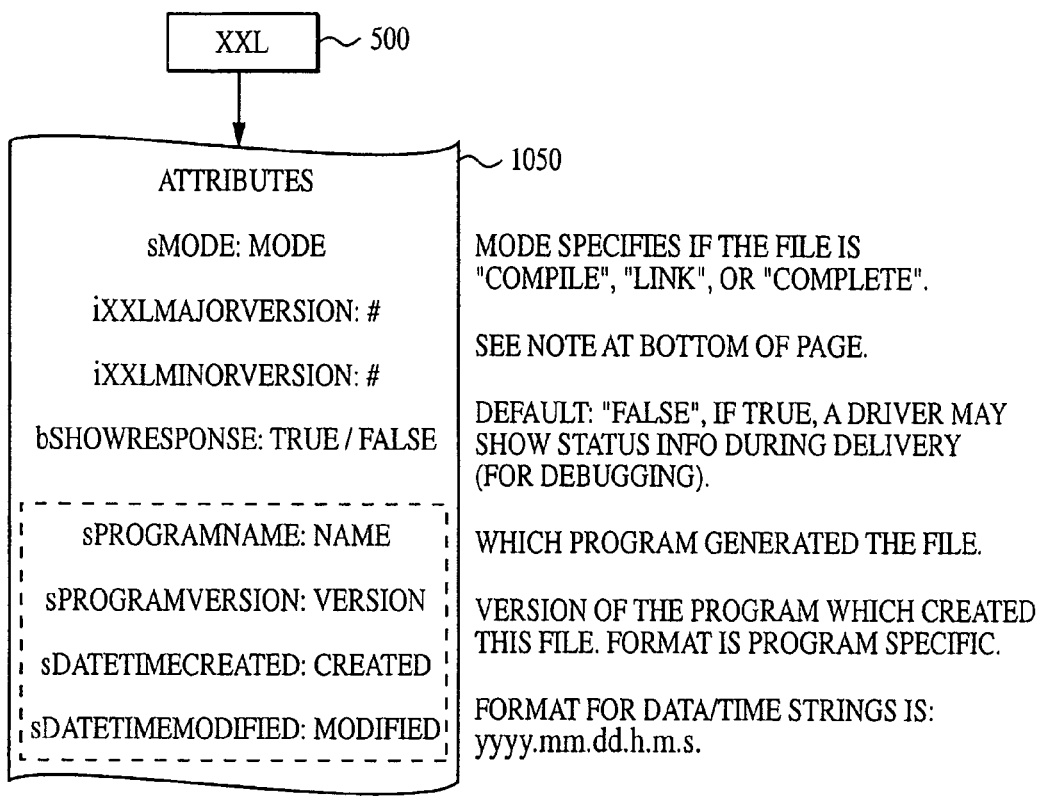
FIG. 21 is a block diagram illustrating an attributes branch of the exam resource file.
Figure 22:
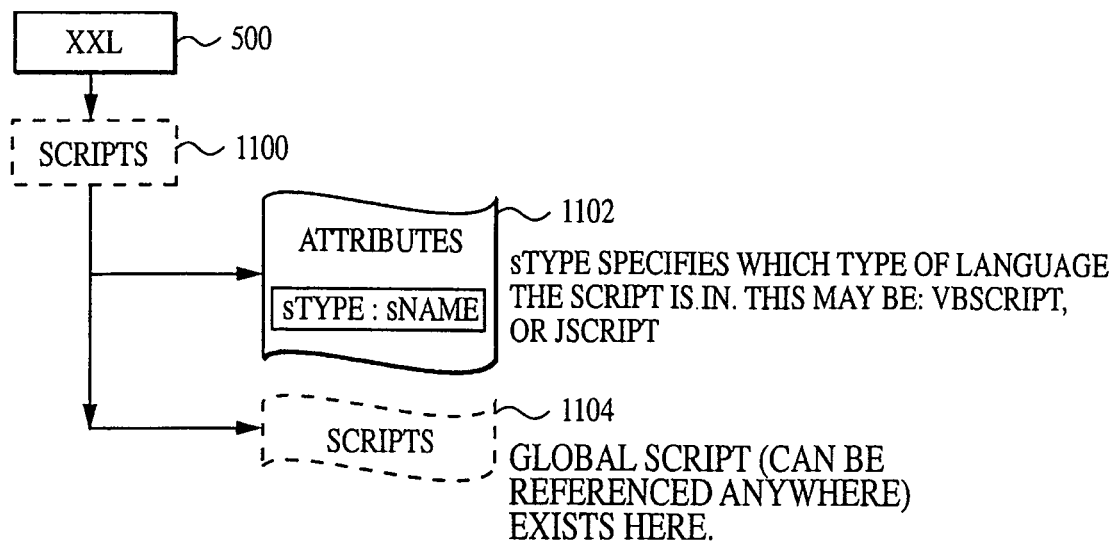
FIG. 22 is a block diagram illustrating a scripts branch of the exam resource file.
Figure 23:
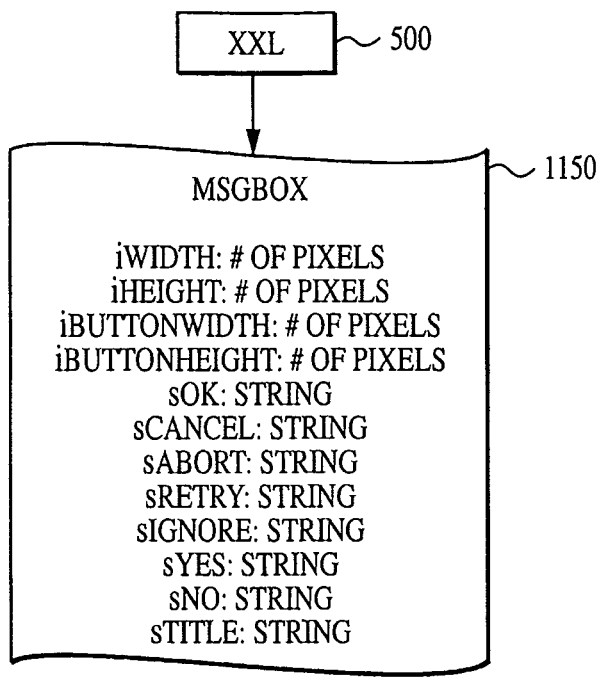
FIG. 23 is a block diagram illustrating a message box branch of the exam resource file.

FormGroups branch 1000, as seen in FIG. 20, stores, for example, the primary attributes properties and data that govern the formGroups of the test. FormGroups branch 1000 can store information for various formGroups, as is denoted by the three, vertical ellipses. A single formGroup is identified by the data stored in name attributes storage 1002. The various formGroups may each be identified by a different name, as denoted by the solid border around name attributes storage 1002. Attributes storage 1004 stores, for example, information indicating which forms are to be used within the form-Group. Selections storage 1006 stores, for example, information relating to the selection of items within the formGroup. Attributes storage 1008 indicates which selection plugin 160 is to be used with the formGroup. Plugin data storage 1010 and plugin data storage 1012 store any information needed for the selection plugin 160. Attributes storage branch 1050 stores, for example, attribute information that is global to exam resource file 120. This includes the last execution state of XXL compiler 140 [sMode], the major [iXXLMajorVersion] and the minor version [iXXLMinorVersion] of the XXL language.

Scripts branch 1100 stores, for example, information relating to scripts used within the test. Attributes storage 1102 stores, for example, type information that specifies which type of language the script is in, for example, VB script of J script. Scripts storage 1104 stores, for example, global scripts used within the test that may be referenced by the test driver. MsgBox branch 1150 stores, for example, information relating to the size and content of any message boxes that may be delivered to the examinee during the test. Message boxes may be triggered by plugins 150 during the exam.

B. Defining a Test with the XXL Test Definition Language

1) Test Production and Test Delivery

Figure 24:
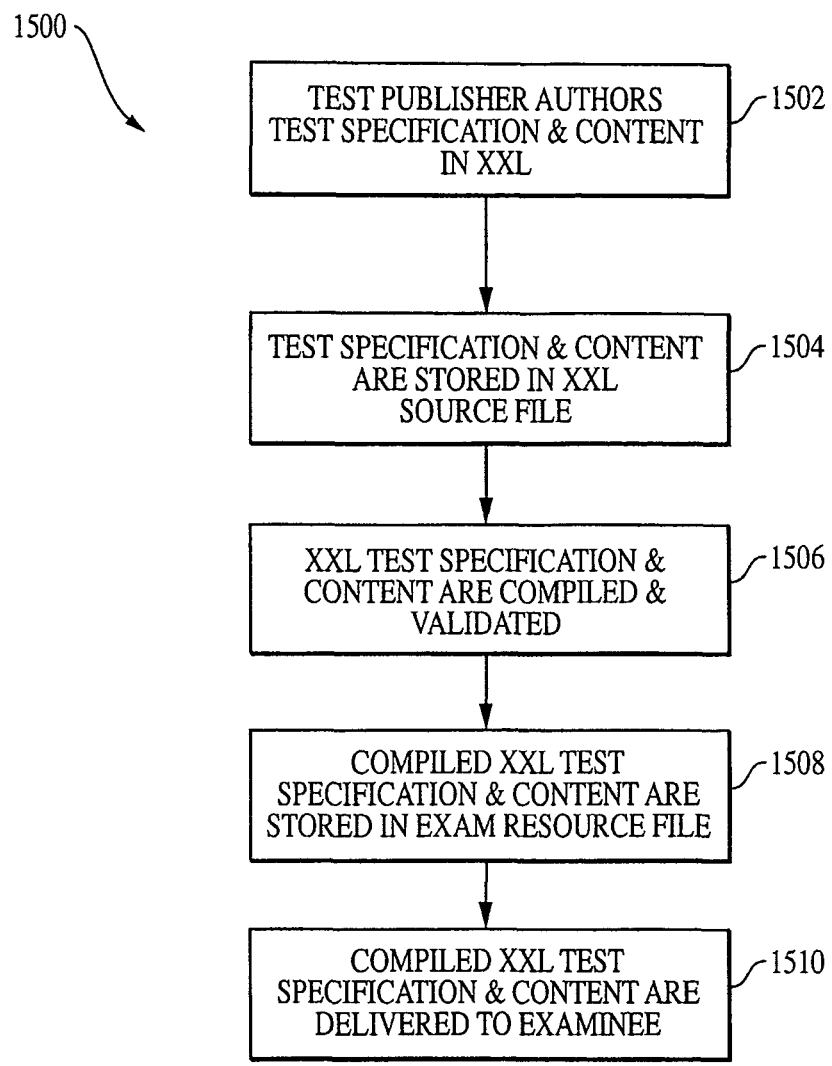
FIG. 24 is a flow chart of a method of test production and test delivery according to the present invention.

FIG. 24 is a flow chart illustrating the overall method of test production and test delivery according to the present invention, denoted generally by reference numeral 1500. The test publisher first authors the test specification and content in the test definition language, for example, XXL, step 1502. The test specification and content are then stored in exam source files 130, specifically, in XXL files 134, step 1504. The content of XXL files 134, are then compiled and validated, step 1506. The compiled XXL test specification and content are stored in exam resource file 120, step 1508. Finally, the compiled XXL test specification and content are delivered to the examinee, step 1510.

Figure 25:
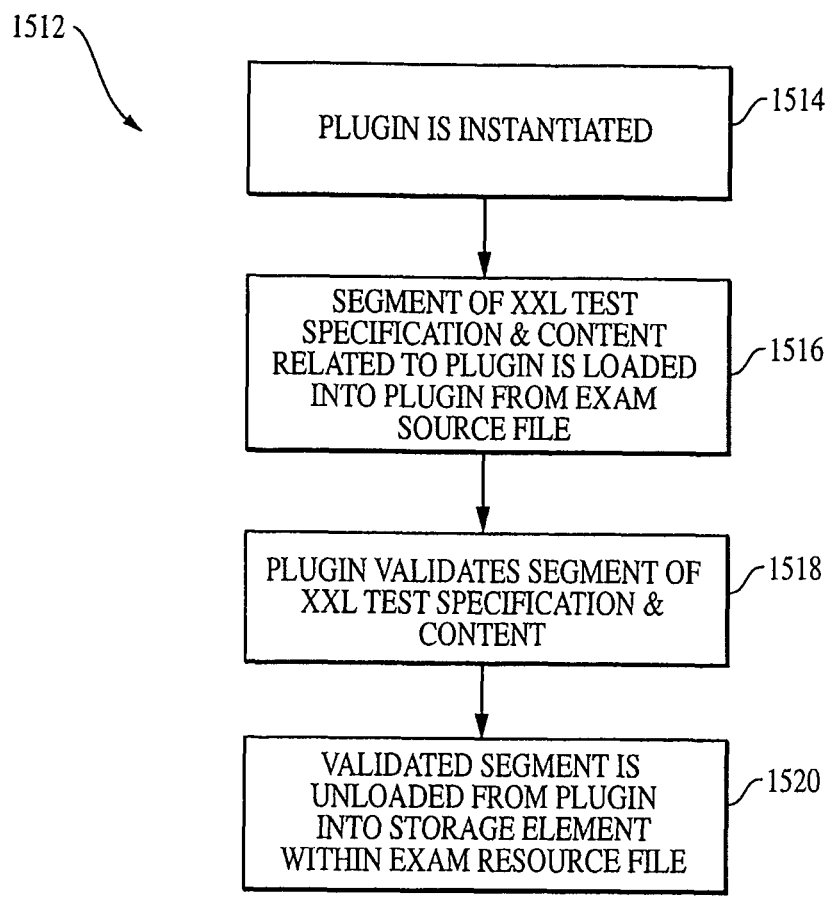
FIG. 25 is a flow chart of a method for validation of test specification and content according to the present invention.

The validation of the test specification and content is illustrated in greater detail in FIG. 25, by the method denoted generally by reference numeral 1512. When the XXL test specification and content stored in exam source files 130 specifically references a plugin 150, that plugin 150 is instantiated, step 1514. The segment of the XXL test specification and content relating to that plugin 150 is loaded into the plugin 150 from exam source files 130, step 1516. In an alternative embodiment, the partial test specification and content is loaded into a private memory in data communication with the plugin 150. The plugin 150 validates the segment of the XXL test specification and content, step 1518. The validated segment of the XXL test specification and content is then unloaded from the plugin 150 into a storage element within exam resource file 120.

Figure 26:
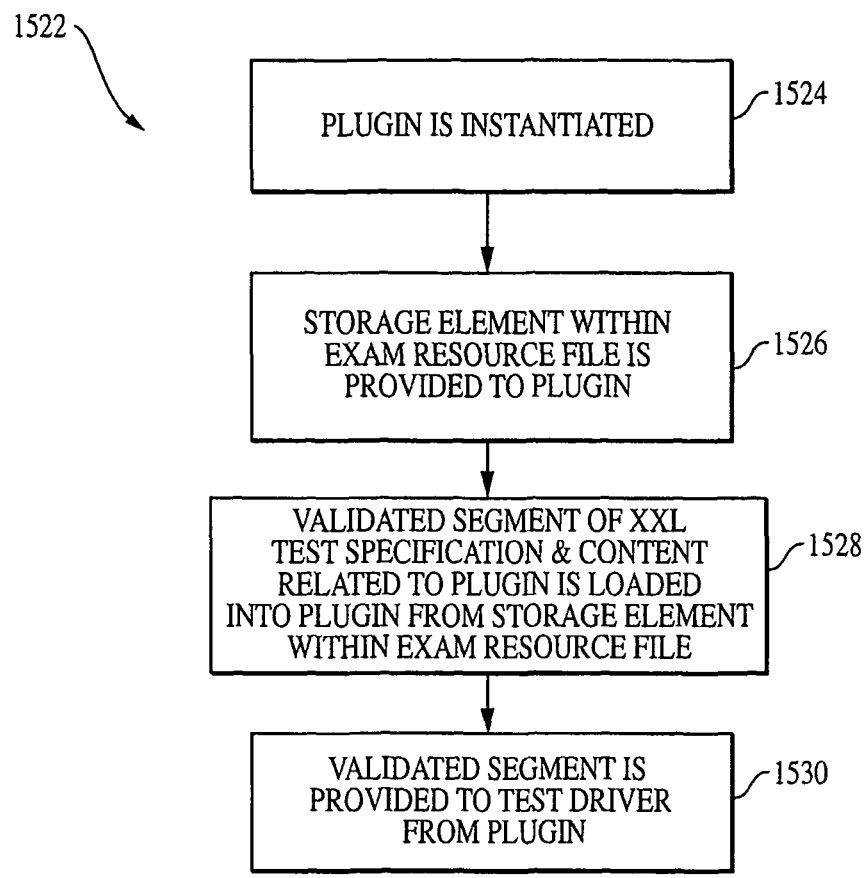
FIG. 26 is a flow chart of a method for test delivery according to the present invention.

FIG. 26 illustrates the method of the test delivery cycle in greater detail. When the previously validated segment of XXL test specification and content stored in exam resource file 120 references a plugin 150, the plugin 150 is instantiated, step 1525. The storage element in exam resource file 120 containing the validated segment of XXL test specification and content is provided to the plugin 150, step 1527. Finally, the validated segment of XXL test specification and content is loaded into the plugin 150 from the storage element within exam resource file 120, step 1529.

2) Flow of a Test

Figure 27:
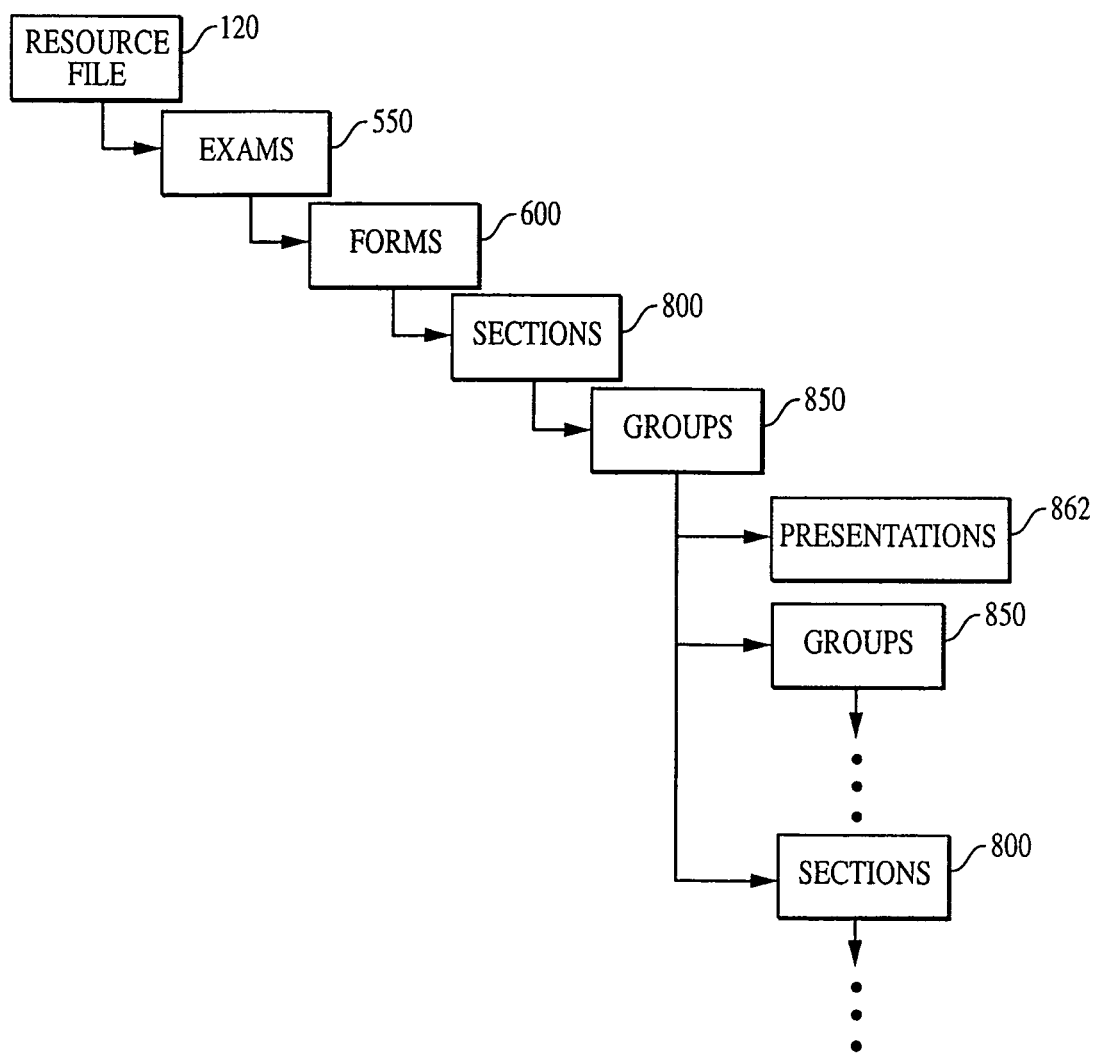
FIG. 27 is a flow diagram illustrating the flow of a test according to the present invention.

During delivery of the test, test driver 110 and plugins 150 retrieve the test specification and content from exam resource file 120. FIG. 27 illustrates the flow of a test. Exam resource file 120 stores the entire test specification and contents of the test. Exams branch 550 stores, for example, information identifying the various forms that define the order (e.g., sequential, non-sequential, random, etc.) of delivery of the test. Forms branch 600 stores, for example, the information for the various forms, including which sections begin and end the test, the order in which presentations to be delivered, timing information, and scoring information included in a particular form. Sections branch 800 stores, for example, information identifying a particular group and the timing and navigation information associated with that group. Groups branch 850 identifies the order of presentations 862, also called events, that are to be delivered to the examinee during a particular section. Groups branch 850 also stores, for example, information for the scoring and selection of items delivered to the examinee during a presentation 862. Groups 850 can also store information for other sub-groups stored in groups branch 850 and sub-sections stored in sections branch 800.

3) XML-Based Language

The XXL language is advantageously based on XML, although other functionally similar languages may optionally be used. XML is a meta-language, meaning that XML can be used to define other languages. XML based languages have several common concepts, including, for example: elements, attributes, and tags. An element, for example "<exam>," is a label for a tag type. An attribute, for example "name="star_trek" is a property of an element. Therefore, the "exam" element would be named or identified as "star trek". A tag is a region of data surrounded by < >. Tags are made up of elements and attributes, for example, <exam name="star_trek">. Alternative formats and/or implementations may optionally be used to implement the attributes, elements, and tags in the present invention. Below are other examples of XXL definitions used for a test:

```
<exam name="star_trek">
<form name="strek01"    title="Star Trek Certification">
<item name="sta_001"    weight="1.0"    scored="true">
```

The element declaration for each element is followed by the attributes assigned to that element.

Any XML based language, including XXL of the present invention, must be both well formed and valid to serve its intended purpose. There are three rules which an XML definition generally follows to be considered "well formed." First, any start tags have, for example, matching end tags that are preceded by a forward slash. For example:

```
Correct:    <exam>    ...    </exam>
Wrong:              <exam>    ...    <exam>
Wrong:              <exam>    ...    </narf>
```

Secondly, there is generally one end tag for every start tag or a single tag with a slash. For example:

```
Correct:    <presentation>    ...    </presentation>
Correct:    <presentation />
Wrong:              <presentation>
Wrong:              <presentation
```

Finally, all tags preferably are properly nested without overlap. For example:

```
Correct:    <exam>    <form>    ...    </form>    </exam>
Wrong:      <exam>    <form>    ...    </exam>    </form>
```

The above rules are exemplary for use of the XXL language in accordance with XML format. However, other alternative formats that implement the standards of the rules described above may optionally be used.

An XML document is considered to be "valid" if the document correctly describes a specific set of data. For a test definition language such as XXL, a document is "valid" if it correctly describes XXL. For example:

```
Correct:    <exam    name="star_trek">
                <formRef    name="strek01" title="Star Trek
Certification" />
                <formRef    name="strek02" title="Star Trek
Certification" />
            </exam>
Wrong:          <exam    name="star_trek">
                <music artist="Chosen Few"    title="Name of
My DJ" />
            </exam>
```

3) XXL Schema

A language created with XML uses a schema to define what tags create the language, what attributes can appear on a certain tag, and the order in which tags may appear. FIG. 28 illustrates an example of an XXL schema that defines the global attribute "name" and the element "form". The element "form" has the global "name" attribute, as well as the attribute "restartable", which is defined within the "form" definition. The "form" element also has child, or sub, element "scoring". The element "scoring" needs to be defined before being assigned (not shown). The XXL schema makes many element token legal at the beginning of the schema.

FIG. 29 illustrates another XXL schema example. In this example, the element "item" is being defined. The "item" elements has several attributes, all of which are defined within the element definition, for example: "name"; "title" "template"; "area"; "weight"; "scored"; and "skipAllowed". In this example, no global attributes have been defined, therefore, all attributes being assigned to the "item" element must be defined within the element definition. The item "element" also has a child element, "data." The XXL schema in its entirety may be found in Appendix A.

Figure 30:
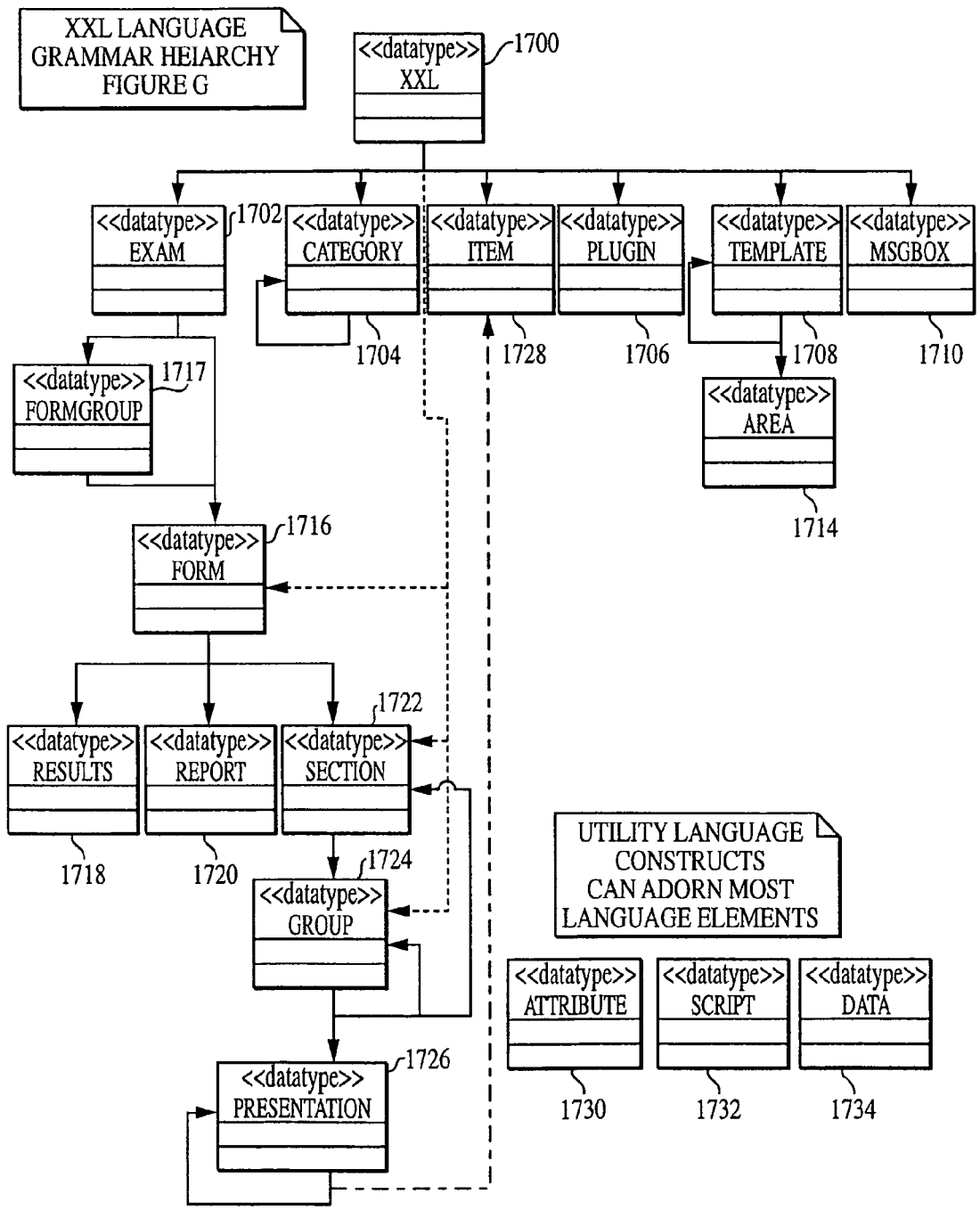
FIG. 30 illustrates the hierarchy of the test definition language according to the present invention.
Figure 31:
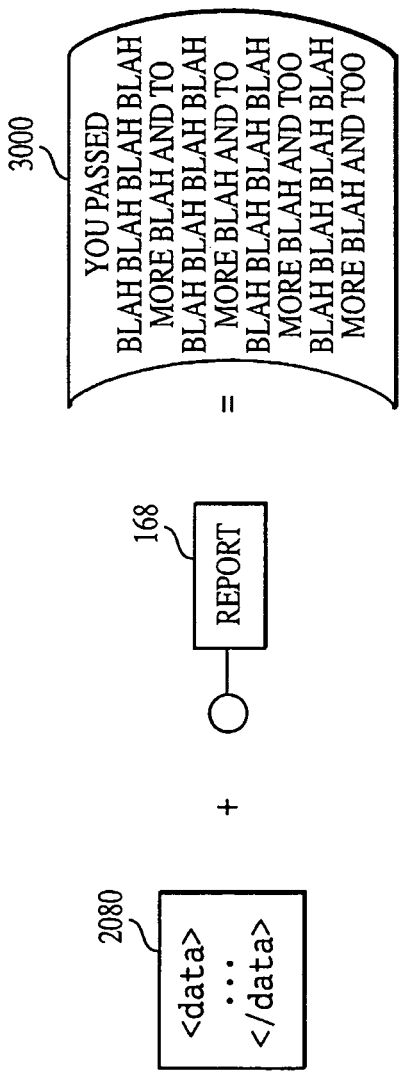
FIG. 31 illustrates how a plugin is used with the test definition language to enable delivery of the computer-based test according to the present invention.

FIG. 30 illustrates the hierarchy of the XXL test definition language. The XXL language's outer most element is XXL element 1700. XXL 1700 includes, for example, the following elements: exam element 1702, category element 1704, item element 1728, plugin element 1706, template element 1708, and MsgBox element 1710. Additionally, form element 1716, section element 1722, and group element 1724 may be defined directly inside XXL element 1700 or in their appropriate place in the hierarchy. When form element 1716, section element 1722, and group element 1724 are defined directly under XXL element 1700, form element 1716, section element 1722, and group element 1724 must be referenced later to be utilized.

Exam element 1702 contains formGroup element 1712 and form element 1716. FormGroup element 1712 may also contain form element 1716 directly. Form element 1716 may contain report element 1720, results element 1718, and section element 1722. Section element 1722 may contain group element 1724. Group element 1724 may contain section element 1722, other group elements 1724 and presentation elements 1726.

Presentation element 1726 references item elements 1728 that are defined under XXL element 1700. Presentation element 1726 may contain other presentation elements 1726.

Category element 1704 may contain other category elements 1704. Template element 1708 may contain area elements 1714 and other template elements 1708. Elements attribute element 1730, script element 1732, and data element 1734 may adorn many language constructs. Attribute element 1730 may be attached to many core elements, including, for example, exam element 1702, form element 1716, section element 1722, presentation element 1726, and item element 1728. Script element 1730 may appear under the following elements, for example: XXL element 1700, form element 1716, section element 1722, presentation element 1726, and item element 1728. Data element 1734 may appear in which ever category contains data for a plugin 150, for example: category element 1704, plugin element 1706, area element 1714, form element 1716, formGroup element 1712, section element 1722, group element 1724, presentation element 1726, and item element 1728.

a) Elements

Elements are defined using the <ElementType> tag. An element can have child elements and/or attributes. There are several attributes on the <ElementType> tag that define the element, for example: "name," "content," "order," and "model". The "name" attribute defines the name of the element, i.e., <form>. The "name" attribute can be assigned, for example, any alphanumerical string value. The "content" attribute defines whether test and/or elements can be defined within the element. For example, the "content" element may be assigned values including, for example: element only ("elt Only"); mixed; empty; and text only. The "order" attribute defines the order of any child elements defined within an element. For example, the "order" element may be assigned values including, for example: "many," which indicates that any ordering of child elements is permissible, and "one," which indicates that only one ordering of child elements is permissible. The "model" attribute indicates whether the XML has to be closed or open and expandable. An open element may contain constructs from another schema or 'namespace'. For example, a 'stem' XXL element, which is the text body of a question, is open. This will allows a test publisher to insert an extensible hypertext markup language ("XHTML") tag provided the test publisher supplies the location of the schema defining XHTML. The XHTML tag allows the test publisher to embed the question text inside the stem element, complete with formatting. A closed element can contain only the elements that are defined. FIG. 28 illustrates how an <ElementType> is used to define the "form" element and FIG. 29 illustrates how an <ElementType> tag is used to define the "item" element.

To use an element within the definition of another element, the <element> tag is used. There are several attributes on the <element> tag that define the use of the element, for example: "type," "minOccurs," and "maxOccurs". The "type" attribute identifies which element is being placed. For example, in FIG. 28, the child element "scoring" is being placed and is the value assigned to the "type" attribute. The "type" attribute can be assigned any alphanumerical string value. The "minOccurs" element defines the minimum number of times the element can appear and is assigned a numerical value, for example, "0". The "maxOccurs" element defines the maximum number of time the element can appear and is also assigned a numerical value. Both "minOccurs" and "maxOccurs" can also be assigned the value "*," or other suitable designation, which indicate that the element may appear an infinite number of times. This value is typically only assigned to the "maxOccurs" attribute.

b) Attributes

Attributes are defined using the <AttributeType> tag. There are several attributes on the <AttributeType> tag that define the attribute, for example: "name," "dt:type,"

"required," "dt:values," and "default". The "name" attribute define the name of the attribute, i.e. "restartable". The "name" attribute can be assigned any alphanumerical string value. The "dt:type" attribute defines the type of the attribute. For example, the "dt:type" attribute may be assigned values including, for example: string, for an alphanumeric string, enumeration, for an attribute that is assigned a value out of a list of possible values (i.e., attribute=true or false), integer, float, for an attribute that has floating decimal point value, and ID. An ID is a string that is unique within the XML document. For example, if the attribute 'name' was a dt:type 'ID', then one name, e.g. "Joe", could be contained in the XML document. ID types are not used in XXL.

The "required" attributed indicates whether or not the element must exist on the element tag in which it is being placed. The "required" attribute is assigned the values, for example, "yes" or "no". The "dt:values" attribute defines the possible values of the enumeration type if "dt:type" is assigned the value "enumeration". For example, "dt:values" may be assigned the value "true false". The "default" attribute indicates the value the attribute is assigned if no other value is specified when the attribute is placed. In FIG. 29, the <AttributeType> tag is used to define the elements "name," "title," "template," "area," "weight," "scored," and "skipAllowed".

To use an attribute within the definition of an element, the <attribute> tag is used. The attribute on the <attribute> that defines the use of the attribute is "type". The "type" attribute identifies which attribute is being placed. The "type" attribute may be assigned any alphanumeric string value. FIG. 29 illustrates how the attributes defined within the "item" element definition and subsequently placed for use with that element using the <attribute> tag.

c) Groups

The <group> tag is used to allow for complex grouping of different elements. In FIG. 28, the <group> tag is used to group, for example, elements "sectionRef" and "section" within the definition for the "form" element. There are several attributes on the <group> tag that define the group, for example: "order"; "minOccurs"; and "maxOccurs". The "order" attribute defines the order in which the child elements being grouped must appear. For example, the "order" element may be assigned values including, for example: "many," which indicates that any ordering of child elements is permissible, and "one," which indicates that only one ordering of child elements is permissible. The "minoccurs" element defines the minimum number of times the element can appear and is assigned a numerical value, for example, "0". The "maxoccurs" element defines the maximum number of time the element can appear and is also assigned a numerical value. Both "minOccurs" and "maxOccurs" can also be assigned the value "*," which indicate that the element may appear an infinite number of times. This value is typically only assigned to the "maxOccurs" attribute.

C. Defining Plugin with the XXL Language

Plugin files 2080 (FIG. 6) are the first, for example, .xml files that are compiled into exam resource file 120. Plugins 150 and plugin files 2080 allow the test publisher to customize the behavior of test driver 110. Plugin files 2080 describe what type of data can be accepted for a particular plugin 150. FIG. 30 illustrates how a plugin 150, in this case, a report plugin 168, is used with data stored in a plugin file 2080 to produce the test's data content and/or presentation format 3000. Having all plugin 150 information in a separate XML file 134 is a convenient way of re-using XML file 134 for many tests and for organizing test data, however this needn't be the case. All XXL information may be in a single XML file 134 or in many files as long as the data is compiled preferably in the order specified in FIG. 6.

The <data> tag is used within the XXL definition of a plugin 150 to place all information intended for the plugin 150. Data tells a plugin 150 how the plugin 150 should behave. For example, data can tell the plugin 150 what to display (i.e., visual plugins), what information to print (i.e., report plugin 168), and in what order items should be delivered (i.e., selection plugins 160. Below is an example of an XXL data schema:

```
<ElementType name="data" content="mixed"
    model="open" >
    <AttributeType name="name"           type="ID"
    required="no" />
    <AttributeType name="URI"            type="string"
    required="no" />
    <AttributeType name="keepExternal" type="string"
    required="no" />
    <attribute       type="name"         />
    <attribute       type="URI"          />
    <attribute       type="keepExternal" />
</ElementType>
```

Data can be defined either within the data tag in an element definition or in an external file. The "URI" attribute is a path to an external file. If the data should not be added to exam resource file 120, the "keepExternal" attribute should be assigned the value "true".

Data can be placed as a child element within an element definition. In the XXL specification, the <data> tag is used to identify the data being placed. Below is an example of an XXL definition of data place using the <data> tag:

```
<data>
    <nextPrevious    bgcolor="gray">
        <button   img= "next.bmp"       action= "next" />
        <button   img= "prev.bmp"       action= "previous"
    />
        <button   img= "review.bmp"     action= "review"
    />
    </nextPrevious>
</data>
```

Figure 32:
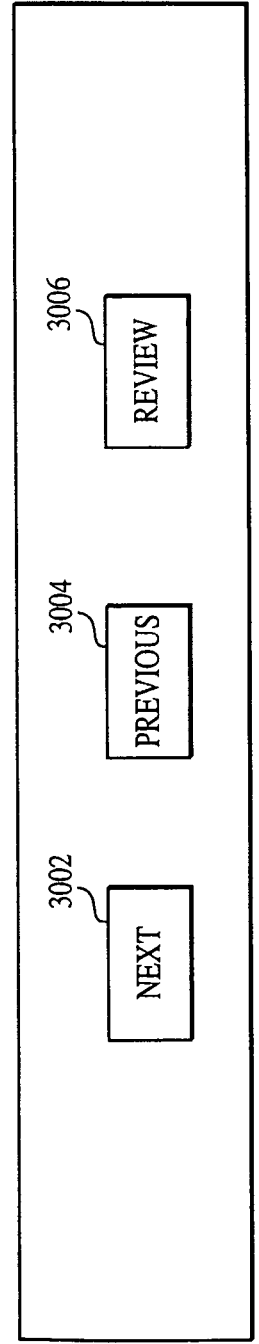
FIG. 32 illustrates a rendering of an example of a definition of data using the test definition language according to the present invention.

FIG. 32 illustrates the rendering of the "nextprevious" helm plugin 154 defined in part with the <data> tag above. The appearance of Next button 3002, Previous button 3004, and Review button 3006 are defined by the values assigned to the "img" attribute.

FIG. 33 illustrates another <data> example. Timer plugin 158, named "mainTimer," is assigned to the attribute "timer" within the <form> element "foobar001" definition. The <form> element is a child element of the <exam> element "foobar". The <data> tag assigns the information for "mainTimer" timer plugin 158. The information assigned to "mainTimer" is a twenty-minute standard timer for form "foobar001" along with a sixty-second "One Minute Left" warning.

FIG. 34 illustrates the concept of XXL referencing. XXL allows for an element to be defined once, and then referenced multiple times later on in the test specification. The references all re-use the original definition of the element and do not perform copy operations. The following are XXL reference elements, for example: categoryRef; formRef; groupRef; and sectionRef. CategoryRef references an existing category element. FormRef references an existing form element. GroupRef references an existing group element. SectionRef references an existing section element.

For example, the test definition illustrated in FIG. 34 is defining the section element "Jeannie." In the later test specification, the form element "JoeFamily1" is defined, which references section "Jeannie" using the sectionRef element. Another form, "JoeFamily2," references the same section "Jeannie" also using the sectionRef element.

In alternative embodiments, similar languages to XML may optionally be used, such as web programming, object oriented programming, JAVA, etc., that provides the functionality described herein. In addition, in alternative embodiments, similar functionality as described herein may be utilized without departing from the present invention.

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction illustrated and described, and accordingly, all suitable modifications and equivalence may be resorted to, falling within the scope of the invention.

What is claimed is:

1. In a computer-based testing system executing at least one test controlled by a test driver, a method for computer-based testing for the at least one test, the at least one test having a presentation format and data content, the method comprising:
   authoring at least one of a plurality of segments of a test definition language in extensible markup language format and storing the at least one of the plurality of segments to a source file;
   instantiating a validation expansion module during a test production cycle;
   loading the at least one of the plurality of segments of the test definition language into a memory from the source file;
   validating the at least one of the plurality of segments;
   unloading the at least one of the plurality of segments from the memory into at least one of a plurality of storage elements;
   providing to the validation expansion module the at least one of the plurality of storage elements;
   loading the at least one of the plurality of segments of the test definition language from the at least one of the plurality of storage elements into the validation expansion module during a test delivery cycle;
   implementing directly by the validation expansion module the information defined by the at least one of the plurality of segments; and
   accessing by the test driver the at least one of the plurality of segments of the test definition language to enable the functionality of the test driver via the direct implementation by the validation expansion module.

2. The method of claim 1, further comprising:
   accessing the at least one of the plurality of segments and creating an exam resource file;
   compiling a test specification and content of the at least one test using the at least one of the plurality of segments and the exam resource file to create a compiled test specification and content.

3. The method of claim 1, further comprising:
   accessing the at least one of the plurality of segments, a first data structure including an element of information from at least one segment and a second data structure including attributes of a test specification.

4. The method of claim 2, further comprising validating at least one of the plurality of segments of the test definition language through a plugin using the exam resource file.

5. The method of claim 1, further comprising accessing the exam resource file using a test driver to deliver a test to an examinee and accessing an at least one plugin for additional data to expand the functionality of the test driver.

6. The method of claim 5, further comprising customizing the at least one plugin without changing the test driver's executable code.

7. The method of claim 5, wherein the at least one plugin is independent from the test driver.

8. The method of claim 1, further comprising executing additional functionality by the test driver using the test definition language without necessitating changes to the test driver's executable code.

9. The method of claim 1, further comprising enabling the test driver to support at least one of new item types, navigation algorithms, information displays, scoring algorithms, timing algorithms, test unit selection algorithms, results persistence reporting, printed score reporting, and helm types without changing the test driver's executable code.

10. In a computer-based testing system executing at least one test controlled by a test driver, a method for computer-based testing for the at least one test, the at least one test having a presentation format and data content, the method:
   authoring at least one of a plurality of element specific data objects and the at least one of a plurality of attribute specific data objects of a test definition language in extensible markup language format and storing the at least one of the plurality of element specific data objects and the at least one of the plurality of attribute specific data objects to a source file;
   instantiating a validation expansion module during a test production cycle;
   loading the at least one of the plurality of element specific data objects and the at least one of the plurality of attribute specific data objects of the test definition language into the validation expansion module from the source file;
   validating the at least one of the plurality of element specific data objects and the at least one of the plurality of attribute specific data objects;
   unloading the at least one of the plurality of element specific data objects and the at least one of the plurality of attribute specific data objects from the memory into at least one of a plurality of storage elements;
   providing to the validation expansion module the at least one of the plurality of storage elements;
   loading the at least one of the plurality of element specific data objects and the at least one of the plurality of attribute specific data objects of the test definition language from the at least one of the plurality of storage elements into the validation expansion module during a test delivery cycle;
   implementing directly by the validation expansion module the information defined by the at least one of the plurality of element specific data objects and the at least one of the plurality of attribute specific data objects; and
   accessing by the test driver the at least one of the plurality of element specific data objects and the at least one of the plurality of attribute specific data objects of the test definition language to enable the functionality of the test driver via the direct implementation by the validation expansion module.

11. The method of claim 10, further comprising:
accessing the at least one of the plurality of element specific data objects and the at least one of the plurality of attribute specific data objects of the test definition language and creating an exam resource file;
compiling a test specification and content of the at least one test using the at least one of the plurality of element specific data objects and the at least one of the plurality of attribute specific data objects and the exam resource file to create a compiled test specification and content.

12. The method of claim 10, further comprising:
accessing at least one of the plurality of element specific data objects and the at least one of the plurality of attribute specific data objects of the test definition language, a first data structure including an element of information from at least one element specific data object of the test definition language and a second data structure including attributes of a test specification.

13. The method of claim 11, further comprising validating at least one of the plurality of element specific data objects and the at least one of the plurality of attribute specific data objects of the test definition language through a plugin using the exam resource file.

14. The method of claim 10, further comprising accessing the exam resource file using a test driver to deliver a test to an examinee and accessing an at least one plugin for additional data to expand the functionality of the test driver.

15. The method of claim 14, further comprising customizing the at least one plugin without changing the test driver's executable code.

16. The method of claim 14, wherein the at least one plugin is independent from the test driver.

17. The method of claim 10, further comprising executing additional functionality by the test driver using the test definition language without necessitating changes to the test driver's executable code.

18. The method of claim 10, further comprising enabling the test driver to support at least one of new item types, navigation algorithms, information displays, scoring algorithms, timing algorithms, test unit selection algorithms, results persistence reporting, printed score reporting, and helm types without changing the test driver's executable code.

19. In a computer-based testing system executing at least one test controlled by a test driver, a method for computer-based testing for the at least one test, the at least one test having a presentation format and data content, the method comprising:
loading at least one of a plurality of element specific data objects and at least one of a plurality of attribute specific data objects of a test definition language in extensible markup language format into a validation expansion module from a source file;
validating the at least one of the plurality of element specific data objects and the at least one of the plurality of attribute specific data objects;
providing to the validation expansion module the at least one of the plurality of storage elements;
implementing directly by the validation expansion module the information defined by the at least one of the plurality of element specific data objects and the at least one of the plurality of attribute specific data objects; and
accessing by the test driver the at least one of the plurality of element specific data objects and the at least one of the plurality of attribute specific data objects of the test definition language to enable the functionality of the test driver via the implementation by the validation expansion module.

20. The method of claim 19, further comprising:
accessing the at least one of the plurality of element specific data objects and the at least one of the plurality of attribute specific data objects and creating an exam resource file;
compiling a test specification and content of the at least one test using the the at least one of the plurality of element specific data objects and the at least one of the plurality of attribute specific data objects and the exam resource file to create a compiled test specification and content.

21. The method of claim 19, further comprising:
accessing the at least one of the plurality of element specific data objects and the at least one of the plurality of attribute specific data objects of the test definition language, a first data structure including an element of information from at least one element specific data object of the test definition language and a second data structure including attributes of a test specification.

22. The method of claim 20, further comprising validating at least one of the plurality of element specific data objects and the at least one of the plurality of attribute specific data objects of the test definition language through a plugin using the exam resource file.

23. The method of claim 19, further comprising accessing the exam resource file using a test driver to deliver a test to an examinee and accessing an at least one plugin for additional data to expand the functionality of the test driver.

24. The method of claim 23, further comprising customizing the at least one plugin without changing the test driver's executable code.

25. The method of claim 23, wherein the at least one plugin is independent from the test driver.

26. The method of claim 19, further comprising executing additional functionality by the test driver using the test definition language without necessitating changes to the test driver's executable code.

27. The method of claim 19, further comprising enabling the test driver to support at least one of new item types, navigation algorithms, information displays, scoring algorithms, timing algorithms, test unit selection algorithms, results persistence reporting, printed score reporting, and helm types without changing the test driver's executable code.

28. A computer-based testing system executing at least one test, comprising:
a computer-implemented test driver having an executable code executed on a computer that controls the computer-implemented test driver and functionality performed by the computer-implemented test driver that enables the computer-implemented test driver to deliver the at least one test, manage the at least one test, and control progression of the at least one test, based on a computer-implemented test definition language in extensible markup language format, and the computer-implemented test driver accessing at least one of a plurality of element specific data objects and at least one of a plurality of attribute specific data objects of the test definition language to enable the functionality of the test driver;
a source file storing the at least one of the plurality of element specific data objects and the at least one of the plurality of attribute specific data objects of the test definition language; and a validation expansion module receiving the at least one of the plurality of element specific data objects and the at least one of the plurality of attribute specific data objects of the computer-implemented test definition language from the source file, validating the at least one of the plurality of element specific data objects and the at least one of the plurality of attribute specific data objects, implementing information defined by the at least one of the plurality of element specific data objects and the at least one of the plurality of attribute specific data objects, and enabling functionality of the test driver via the implementation by said validation expansion module.

* * * * *